United States Patent
Hayakawa

(10) Patent No.: US 8,219,428 B2
(45) Date of Patent: Jul. 10, 2012

(54) SYSTEM AND METHOD FOR DETERMINING A FRANCHISEE COMMITMENT FEE BASED ON A DETERMINED COST STANDARD

(75) Inventor: Kazuhiro Hayakawa, Inzai (JP)

(73) Assignee: CBH Inc., Inzai-shi (JP)

( * ) Notice: Subject to any disclaimer, the term of this patent is extended or adjusted under 35 U.S.C. 154(b) by 0 days.

(21) Appl. No.: 12/970,661

(22) Filed: Dec. 16, 2010

(65) Prior Publication Data

US 2011/0087507 A1  Apr. 14, 2011

Related U.S. Application Data

(63) Continuation of application No. PCT/JP2008/062628, filed on Jul. 11, 2008.

(51) Int. Cl.
*G06Q 10/00* (2012.01)
(52) U.S. Cl. ...................................................... 705/7.11
(58) Field of Classification Search .................. 705/7.11
See application file for complete search history.

(56) References Cited

U.S. PATENT DOCUMENTS

| | | | | |
|---|---|---|---|---|
| 5,193,055 A * | 3/1993 | Brown et al. | ........... | 705/33 |
| 5,615,109 A * | 3/1997 | Eder | ........... | 705/7.12 |
| 7,082,569 B2 * | 7/2006 | Voshell | ........... | 715/212 |
| 7,092,929 B1 * | 8/2006 | Dvorak et al. | ........... | 705/28 |
| 7,149,707 B2 * | 12/2006 | Scoble | ........... | 705/14.16 |
| 7,177,834 B1 * | 2/2007 | Maestle | ........... | 705/38 |
| 7,222,110 B2 * | 5/2007 | Onoue | ........... | 705/400 |
| 7,302,409 B2 * | 11/2007 | Hayashi | ........... | 705/30 |
| 7,346,588 B2 * | 3/2008 | Shimizu et al. | ........... | 705/400 |
| 7,505,923 B1 * | 3/2009 | Yoshioka | ........... | 705/26.1 |
| 7,548,879 B2 * | 6/2009 | Cash et al. | ........... | 705/35 |
| 7,933,791 B2 * | 4/2011 | Nelmes et al. | ........... | 705/7.11 |
| 8,078,484 B2 * | 12/2011 | Benson et al. | ........... | 705/7.11 |
| 2002/0106613 A1 * | 8/2002 | Takada | ........... | 434/1 |
| 2003/0182212 A1 * | 9/2003 | Moscone et al. | ........... | 705/30 |

(Continued)

FOREIGN PATENT DOCUMENTS

JP  2003-006413 A  1/2003

(Continued)

OTHER PUBLICATIONS

Harsh, Laurie, Money Matters—Benchmarks for Quilt Shops—Key Financial Ratios Craftrends, Oct. 2003.*

(Continued)

*Primary Examiner* — Scott L Jarrett
(74) *Attorney, Agent, or Firm* — Baker & Hostetler LLP

(57) ABSTRACT

A cost standard determination system and a cost standard calculation module are provided. The system enables the operational effort of a store operation by a store operator to be reflected in a commitment fee, thereby promoting the independence support of employees. A cost standard is a value serving as a basis for the calculation of a commitment fee paid by a store owner who owns the store to the store operator to whom the store operation is committed and is used as a reference value for evaluating the operation of the store by the store operator. The cost standard calculation module has five cost standard calculation processing functions corresponding to five cost attributes (controllable attribute, permittable attribute, controllable & permittable attribute, uncontrollable attribute, and uncontrollable-based-charge attribute) and calculates a proper cost standard for each of a plurality of accounts on the cost by selectively using the five cost standard calculation processing functions.

8 Claims, 17 Drawing Sheets

U.S. PATENT DOCUMENTS

| | | | |
|---|---|---|---|
| 2005/0144096 A1* | 6/2005 | Caramanna et al. | 705/30 |
| 2008/0059279 A1* | 3/2008 | Goldschneider et al. | 705/10 |
| 2008/0249815 A1* | 10/2008 | Helal | 705/7 |
| 2009/0076867 A1* | 3/2009 | Eryaman | 705/7 |
| 2009/0138342 A1* | 5/2009 | Otto et al. | 705/11 |
| 2010/0070348 A1* | 3/2010 | Nag | 705/11 |

FOREIGN PATENT DOCUMENTS

| | | |
|---|---|---|
| JP | 2006-318164 A | 11/2006 |
| WO | WO 02/102097 | * 12/2002 |

OTHER PUBLICATIONS

The ABCs of Financial Performance Measures and Benchmarks for Canada's Tourism Sector, Financial Planning: Key to Maximizing Your Bottom Line, Guide 1, Canada Tourism Commission, 2003.*

The ABCs of Financial Performance Measures and Benchmarks for Canada's Tourism Sector, Financial Performance Measures and Benchmarks for Canda's Tourism Operators, Guide 3, Canada Tourism Commission, 2003.*

Walker, Kenneth D., In Praise of Benchmarking Franchising World, vol. 36, No. 8, Sep. 2004.*

Batcherlo, Rick, Metrics That Matter: Benchmarking Franchising World, vol. 38, No. 10, Oct. 2006.*

Frandata.com Web Pages—Benchmarking & Comparisons Franchise Information Services, Inc., Mar. 2006, Retrieved from Archive.org Dec. 22, 2011.*

Carden, John G.D., A Framework for Evaluating Operating Performance Ohio CPA Journal, vol. 44, No. 2, Spring 1985.*

ProfitSoup.com Web Pages PofitSoup, Aug. 2008, Retrieved from Archive.org Dec. 22, 2011.*

Schmidgall, Ray et al., Comparing Scores: Measuring Club Performance Through Ration Analysis the Bottom Line, vol. 20, No. 3, Apr./May 2005.*

Cost-volume-profit analysis—definition Wikipedia.org, Retrieved Dec. 22, 2011.*

Edlendburg, Cost-Volume-Profit Analysis, Chapter 3 Wiley, Inc., Sep. 24, 2007.*

Accounting for Management—Definitions—Accounting Ratios, Financial Accounting Ratios Formulas Retrieved from AccountingForManagement.com Dec. 22, 2011.*

Arellano, Fernando, A Note on the Determination of Cost Structure University of Dallas, Feb. 2008.*

Vasquez, Luis, Up-front Franchising Fees and Ongoing Variable Payment Substitutes: An Agency Persective Review of Industrial Organization, vol. 26, 2005.*

Kaufman, Patric J. et al., The pricing of franchise rights Journal of Retailing, vol. 77, 2001.*

Tikoo, Surinder et al., Variable Royalty Rates for Improving Franchise Channel Coordination Decision Sciences, vol. 30, No. 2, Spring 1999.*

Sen, Kabir C., The Use of Initial Fees and Royalties in Business Format Franchising Managerial and Decision Economics, vol. 14, No. 2, Mar./Apr. 1993.*

Blair, Roger D., Optimal Franchising Southern Economic Journal, vol. 39, No. 2, Oct. 1982.*

Windsperger, Josef, The fee structure in franchising: a property rights view Economics Letters, vol. 73, 2001.*

Spinelli, Stephen et al., The Weath Creating Power of Franchising Financial Times Press, Jan. 9, 2004.*

Pricing of Franchises: How to Charge Fees, Area Development Fees, etc.—Establishing and Continuing Other Fees MSA Worldwide, Date Unknown.*

* cited by examiner

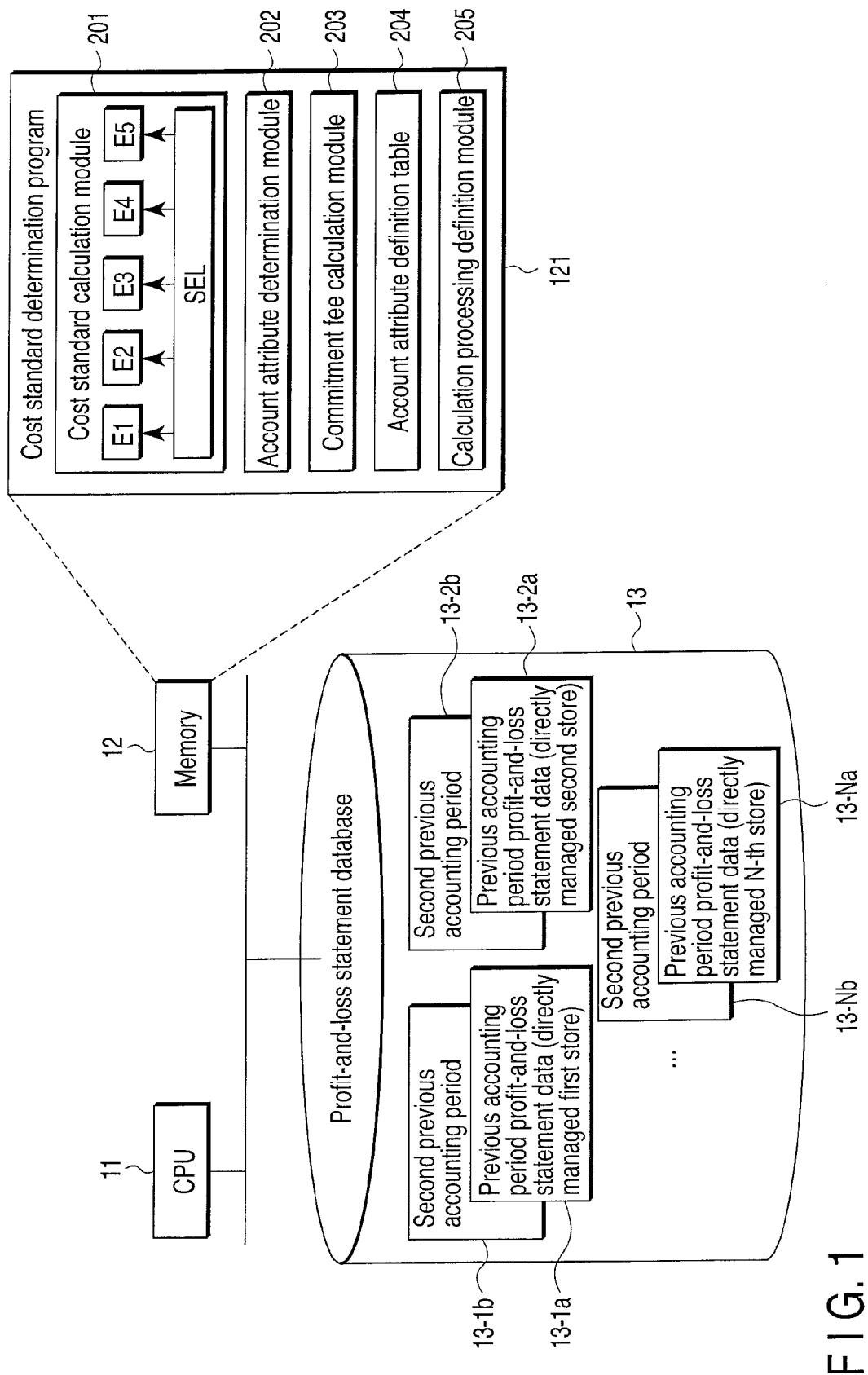
F I G. 1

| Accounts | Attributes |
|---|---|
| Purchase | C |
| Salaries | P |
| Incentive | |
| Wages | C & P |
| Legal welfare expense | UC |
| Welfare | |
| Advertising | C & P |
| Sales promotion expense | C |
| Travel and transportation/commutation expense | C |
| Supplies | C |
| Repairs | C |
| Linen expense | C |
| Utilities | C |
| Communication | C |
| Stationery expense | C & P |
| Meeting | P |
| Outsourcing expense | P |
| Management expense | UC |
| Rental expense | C |
| Recruit expense | C |
| Insurance | UC |
| Taxes (stamp tax) | UCBC |
| Payment to advisors | |
| Commission | P |
| Miscellaneous expenses | C & P |
| Taxes (fixed asset tax) | UC |
| Interest | UC |
| Management service expense | UCBC |

| Attributes | Process ID |
|---|---|
| C | Process A |
| P | Process B |
| C & P | Process C |
| UC | Process D |
| UCBC | Process E |

FIG. 3

|  | December 2006 Profit-and-loss statement | | | |
|---|---|---|---|---|
|  | Directly managed first store (s) | | Directly managed second store (t) | |
| Accounts | Costs | Ratio of cost to sales | Costs | Ratio of cost to sales |
| Sales | ***** | 100.0% | ***** | 100.0% |
| Purchase | ***** | *.*% | ***** | *.*% |
| Gross profit | ***** | *.*% | ***** | *.*% |
| Salaries | ***** | *.*% | ***** | *.*% |
| Incentive | ***** | *.*% | ***** | *.*% |
| Wages | ***** | *.*% | ***** | *.*% |
| Legal welfare expense | ***** | *.*% | ***** | *.*% |
| Welfare | ***** | *.*% | ***** | *.*% |
| Advertising | ***** | *.*% | ***** | *.*% |
| Sales promotion expense | ***** | *.*% | ***** | *.*% |
| Travel and transportation /commutation expens | ***** | *.*% | ***** | *.*% |
| Supplies | ***** | *.*% | ***** | *.*% |
| Repairs | ***** | *.*% | ***** | *.*% |
| Linen expense | ***** | *.*% | ***** | *.*% |
| Utilities | ***** | *.*% | ***** | *.*% |
| Communication | ***** | *.*% | ***** | *.*% |
| Stationery expense | ***** | *.*% | ***** | *.*% |
| Meeting | ***** | *.*% | ***** | *.*% |
| Outsourcing expense | ***** | *.*% | ***** | *.*% |
| Rental | ***** | *.*% | ***** | *.*% |
| Depreciation | ***** | *.*% | ***** | *.*% |
| Rental expense | ***** | *.*% | ***** | *.*% |
| Recruit expense | ***** | *.*% | ***** | *.*% |
| Insurance | ***** | *.*% | ***** | *.*% |
| Taxes | ***** | *.*% | ***** | *.*% |
| Payment to advisors | ***** | *.*% | ***** | *.*% |
| Commission | ***** | *.*% | ***** | *.*% |
| Miscellaneous expenses | ***** | *.*% | ***** | *.*% |
| Executive compensation | ***** | *.*% | ***** | *.*% |
| Total of costs | ***** | *.*% | ***** | *.*% |
|  |  |  |  |  |
| Operating profit | ***** | *.*% | ***** | *.*% |
| Interest | ***** | *.*% | ***** | *.*% |
| Recurring profit | ***** | *.*% | ***** | *.*% |
| Extraordinary profit/loss | ***** | *.*% | ***** | *.*% |
| Pretax profit | ***** | *.*% | ***** | *.*% |

F I G. 9

| A table | | December 2006 Average of two stores $A = (s+t)/2$ | |
|---|---|---|---|
| No. | Accounts | Costs | Ratio of cost to sales |
| 1 | Sales | ***** | 100.0% |
| 2 | Purchase | ***** | *.*% |
| 3 | Gross profit | ***** | *.*% |
| 4 | Salaries | ***** | *.*% |
| 5 | Incentive | ***** | *.*% |
| 6 | Wages | ***** | *.*% |
| 7 | Legal welfare expense | ***** | *.*% |
| 8 | Welfare | ***** | *.*% |
| 9 | Advertising | ***** | *.*% |
| 10 | Sales promotion expense | ***** | *.*% |
| 11 | Travel and transportation /commutation expens | ***** | *.*% |
| 12 | Supplies | ***** | *.*% |
| 13 | Repairs | ***** | *.*% |
| 14 | Linen expense | ***** | *.*% |
| 15 | Utilities | ***** | *.*% |
| 16 | Communication | ***** | *.*% |
| 17 | Stationery expense | ***** | *.*% |
| 18 | Meeting | ***** | *.*% |
| 19 | Outsourcing expense | ***** | *.*% |
| 20 | Rental | ***** | *.*% |
| 21 | Depreciation | ***** | *.*% |
| 22 | Rental expense | ***** | *.*% |
| 23 | Recruit expense | ***** | *.*% |
| 24 | Insurance | ***** | *.*% |
| 25 | Taxes | ***** | *.*% |
| 26 | Payment to advisors | ***** | *.*% |
| 27 | Commission | ***** | *.*% |
| 28 | Miscellaneous expenses | ***** | *.*% |
| 29 | Executive compensation | ***** | *.*% |
| 30 | Total of costs | ***** | *.*% |
| | | | |
| 31 | Operating profit | ***** | *.*% |
| 32 | Interest | ***** | *.*% |
| 33 | Recurring profit | ***** | *.*% |
| 34 | Extraordinary profit/loss | ***** | *.*% |
| 35 | Pretax profit | ***** | *.*% |

FIG. 10

|  | December 2007 Profit-and-loss statement | | | |
|---|---|---|---|---|
|  | Directly managed first store (u) | | Directly managed second store (v) | |
| Accounts | Costs | Ratio of cost to sales | Costs | Ratio of cost to sales |
| Sales | ***** | 100.0% | ***** | 100.0% |
| Purchase | ***** | *.*% | ***** | *.*% |
| Gross profit | ***** | *.*% | ***** | *.*% |
| Salaries | ***** | *.*% | ***** | *.*% |
| Incentive | ***** | *.*% | ***** | *.*% |
| Wages | ***** | *.*% | ***** | *.*% |
| Legal welfare expense | ***** | *.*% | ***** | *.*% |
| Welfare | ***** | *.*% | ***** | *.*% |
| Advertising | ***** | *.*% | ***** | *.*% |
| Sales promotion expense | ***** | *.*% | ***** | *.*% |
| Travel and transportation /commutation expens | ***** | *.*% | ***** | *.*% |
| Supplies | ***** | *.*% | ***** | *.*% |
| Repairs | ***** | *.*% | ***** | *.*% |
| Linen expense | ***** | *.*% | ***** | *.*% |
| Utilities | ***** | *.*% | ***** | *.*% |
| Communication | ***** | *.*% | ***** | *.*% |
| Stationery expense | ***** | *.*% | ***** | *.*% |
| Meeting | ***** | *.*% | ***** | *.*% |
| Outsourcing expense | ***** | *.*% | ***** | *.*% |
| Rental | ***** | *.*% | ***** | *.*% |
| Depreciation | ***** | *.*% | ***** | *.*% |
| Rental expense | ***** | *.*% | ***** | *.*% |
| Recruit expense | ***** | *.*% | ***** | *.*% |
| Insurance | ***** | *.*% | ***** | *.*% |
| Taxes | ***** | *.*% | ***** | *.*% |
| Payment to advisors | ***** | *.*% | ***** | *.*% |
| Commission | ***** | *.*% | ***** | *.*% |
| Miscellaneous expenses | ***** | *.*% | ***** | *.*% |
| Executive compensation | ***** | *.*% | ***** | *.*% |
| Total of costs | ***** | *.*% | ***** | *.*% |
|  |  |  |  |  |
| Operating profit | ***** | *.*% | ***** | *.*% |
| Interest | ***** | *.*% | ***** | *.*% |
| Recurring profit | ***** | *.*% | ***** | *.*% |
| Extraordinary profit/loss | ***** | *.*% | ***** | *.*% |
| Pretax profit | ***** | *.*% | ***** | *.*% |

F I G. 11

| B table | | December 2007 Average of two stores B = (u+v)/2 | |
|---|---|---|---|
| No. | Accounts | Costs | Ratio of cost to sales |
| 36 | Sales | ***** | 100.0% |
| 37 | Purchase | ***** | *.*% |
| 38 | Gross profit | ***** | *.*% |
| 39 | Salaries | ***** | *.*% |
| 40 | Incentive | ***** | *.*% |
| 41 | Wages | ***** | *.*% |
| 42 | Legal welfare expense | ***** | *.*% |
| 43 | Welfare | ***** | *.*% |
| 44 | Advertising | ***** | *.*% |
| 45 | Sales promotion expense | ***** | *.*% |
| 46 | Travel and transportation /commutation expens | ***** | *.*% |
| 47 | Supplies | ***** | *.*% |
| 48 | Repairs | ***** | *.*% |
| 49 | Linen expense | ***** | *.*% |
| 50 | Utilities | ***** | *.*% |
| 51 | Communication | ***** | *.*% |
| 52 | Stationery expense | ***** | *.*% |
| 53 | Meeting | ***** | *.*% |
| 54 | Outsourcing expense | ***** | *.*% |
| 55 | Rental | ***** | *.*% |
| 56 | Depreciation | ***** | *.*% |
| 57 | Rental expense | ***** | *.*% |
| 58 | Recruit expense | ***** | *.*% |
| 59 | Insurance | ***** | *.*% |
| 60 | Taxes | ***** | *.*% |
| 61 | Payment to advisors | ***** | *.*% |
| 62 | Commission | ***** | *.*% |
| 63 | Miscellaneous expenses | ***** | *.*% |
| 64 | Executive compensation | ***** | *.*% |
| 65 | Total of costs | ***** | *.*% |
| | | | |
| 66 | Operating profit | ***** | *.*% |
| 67 | Interest | ***** | *.*% |
| 68 | Recurring profit | ***** | *.*% |
| 69 | Extraordinary profit/loss | ***** | *.*% |
| 70 | Pretax profit | ***** | *.*% |

FIG. 12

Calculation of reference sales
Average sales C   (No. 1)+(No. 36)/2   *****
Reference sales (greater of C and 400 million yen) D   *****
Calculation of variable cost ratio a and fixed cost
b in fixed/variable division formula
(Example) Purchase
a = {B (purchase) − A (purchase)}/{B (sales) − A (sales)}
b = B (purchase) − B (sales) ×a

| Accounts | Variable cost ratio a | Fixed cost b |
|---|---|---|
| Purchase | 0.***** | ***** |
|  |  |  |
| Salaries | 0.***** | ***** |
| Incentive | 0.***** | ***** |
| Wages | 0.***** | ***** |
| Legal welfare expense | 0.***** | ***** |
| Welfare | 0.***** | ***** |
| Advertising | 0.***** | ***** |
| Sales promotion expense | 0.***** | ***** |
| Travel and transportation /commutation expens | 0.***** | ***** |
| Supplies | 0.***** | ***** |
| Repairs | 0.***** | ***** |
| Linen expense | 0.***** | ***** |
| Utilities | 0.***** | ***** |
| Communication | 0.***** | ***** |
| Stationery expense | 0.***** | ***** |
| Meeting | 0.***** | ***** |
| Outsourcing expense | 0.***** | ***** |
| Rental | 0.***** | ***** |
| Depreciation | 0.***** | ***** |
| Rental expense | 0.***** | ***** |
| Recruit expense | 0.***** | ***** |
| Insurance | 0.***** | ***** |
| Taxes (stamp tax) | 0.***** | ***** |
| Payment to advisors | 0.***** | ***** |
| Commission | 0.***** | ***** |
| Miscellaneous expenses | 0.***** | ***** |

FIG. 13

| Cost obtained by fixed/variable division formula ||||
| C table || Cost of each item being calculated by D × a + b ||
| Accounts | Attributes | Costs | Ratio of cost to reference sales |
|---|---|---|---|
| Reference sales: D | | ***** | 100.0% |
| Purchase | C | ***** | *.*% |
| | | | |
| Salaries | P | ***** | *.*% |
| Incentive | | ***** | *.*% |
| | | | |
| Wages | C & P | ***** | *.*% |
| Legal welfare expense | UC | ***** | *.*% |
| Welfare | | ***** | *.*% |
| Advertising | C & P | ***** | *.*% |
| Sales promotion expense | C | ***** | *.*% |
| Travel and transportation /commutation expens | C | ***** | *.*% |
| Supplies | C | ***** | *.*% |
| Repairs | C | ***** | *.*% |
| Linen expense | C | ***** | *.*% |
| Utilities | C | ***** | *.*% |
| Communication | C | ***** | *.*% |
| Stationery expense | C | ***** | *.*% |
| Meeting | P | ***** | *.*% |
| Outsourcing expense | P | ***** | *.*% |
| Management expense | UC | ***** | *.*% |
| | | | |
| Rental expense | C | ***** | *.*% |
| Recruit expense | C | ***** | *.*% |
| Insurance | UC | ***** | *.*% |
| Taxes (stamp tax) | UCBC | ***** | *.*% |
| Payment to advisors | | | |
| Commission | P | ***** | *.*% |
| Miscellaneous expenses | C & P | ***** | *.*% |
| Taxes (fixed asset tax) | UC | ***** | *.*% |
| Interest | UC | ***** | *.*% |
| Management service expense | UCBC | ***** | *.*% |

F I G. 14

| Determination formula and cost standard |||||
|---|---|---|---|
| Accounts | Attributes | Determination formula | Cost standard |
| Purchase | C | Lowest ratio [%] of values in A table, B table and C table | *.* % |
| | | | |
| Salaries | P | Second smallest amount of values in A table, B table and C table | ***** |
| Incentive | | | |
| Wages | C & P | Second lowest ratio [%] of values in A table, B table and C table | *.* % |
| Legal welfare expense | UC | Provisional amount | ***** |
| Welfare | | | |
| Advertising | C & P | Second lowest ratio [%] of values in A table, B table and C table | *.* % |
| Sales promotion expense | C | Lowest ratio [%] of values in A table, B table and C table | *.* % |
| Travel and transportation /commutation expens | C | Lowest ratio [%] of values in A table, B table and C table | *.* % |
| Supplies | C | Lowest ratio [%] of values in A table, B table and C table | *.* % |
| Repairs | C | Lowest ratio [%] of values in A table, B table and C table | *.* % |
| Linen expense | C | Lowest ratio [%] of values in A table, B table and C table | *.* % |
| Utilities | C | Lowest ratio [%] of values in A table, B table and C table | *.* % |
| Communication | C | Lowest ratio [%] of values in A table, B table and C table | *.* % |
| Stationery expense | C & P | Second lowest ratio [%] of values in A table, B table and C table | *.* % |
| Meeting | P | Second smallest amount of values in A table, B table and C table | ***** |
| Outsourcing expense | P | Second smallest amount of values in A table, B table and C table | ***** |
| Management expense | UC | Rental + construction cost × *% | ***** |
| | | | |
| Rental expense | C | Lowest ratio [%] of values in A table, B table and C table | *.* % |
| Recruit expense | C | Lowest ratio [%] of values in A table, B table and C table | *.* % |
| Insurance | UC | Actual amount of construction comprehensive damage insurance fee | ***** |
| Taxes(stamp tax) | UCBC | *% of sales | *.* % |
| Payment to advisors | | | |
| Commission | P | Second smallest amount of values in A table, B table and C table | ***** |
| Miscellaneous expenses | C & P | Second lowest ratio [%] of values in A table, B table and C table | *.* % |
| Taxes (fixed asset tax) | UC | Actual amount of fixed asset tax | ***** |
| Interest | UC | (Construction cost + security deposit) × (short-term prime + α) | ***** |
| Management service expense | UCBC | *% of sales | *.* % |

FIG. 15

Calculation of cost standard of purchase

Attribute: C (controllable)

| | Accounting period | 2006 | | 2007 | | |
|---|---|---|---|---|---|---|
| | Store | First store | Second store | First store | Second store | |
| | | (1) | (2) | (3) | (4) | Obtained from profit-and-loss statement data |
| Sales | | 281,990,680 | 435,403,000 | 366,899,348 | 510,988,637 | |
| | | (5)={(1)+(2)}/2 | | (6)={(3)+(4)}/2 | | |
| | | 358,696,840 | | 438,943,993 | | |
| | | (7)={(1)+(2)+(3)+(4)}/4 | | | | |
| Average sales | | | | 398,820,416 | | |
| | | (8) | | | | Greater of average sales (7) and minimum reference sales |
| Reference sales | | 400,000,000 | | | | |
| | | (9) | (10) | (11) | (12) | Obtained from profit-and-loss statement data |
| Cost of purchase | | 120,375,000 | 148,121,000 | 155,146,383 | 164,450,826 | |
| | | (13)={(9)+(10)}/2 | | (14)={(11)+(12)}/2 | | |
| Average purchase | | 134,248,000 | | 159,798,605 | | |
| | | (15)=(13)/(5) | | (16)=(14)/(6) | | |
| Ratio of average purchase to average sales | | 37.4% | | 36.4% | | |

(17)={(14)−(13)}/{(6)−(5)}

Variable cost ratio a: 0.318398893

(18)=(14)−(6)×(17)

Fixed cost b: 20,039,323

(19)=(8)×(17)+(18)

147,398,880

(20)=(19)÷(8)

36.8%

Standard cost of purchase: 36.4%   Lowest value of (15), (16) and (20)

F I G. 16

| Calculation of cost standard of salaries | | | | | |
|---|---|---|---|---|---|
| Attribute: P (Permittable) | | | | | |
| Accounting period | 2006 | | 2007 | | |
| Store | First store | Second store | First store | Second store | |
| | (1) | (2) | (3) | (4) | Obtained from profit-and-loss statement data |
| Sales | 281,990,680 | 435,403,000 | 366,899,348 | 510,988,637 | |
| | (5)={(1)+(2)}/2 | | (6)={(3)+(4)}/2 | | |
| | | 358,696,840 | | 438,943,993 | |
| | (7)={(1)+(2)+(3)+(4)}/4 | | | | |
| Average sales | | | | 398,820,416 | |
| | (8) | | | | Greater of average sales (7) and minimum reference sales |
| Reference sales | 400,000,000 | | | | |
| | (9) | (10) | (11) | (12) | Obtained from profit-and-loss statement data |
| Salaries | 38,712,000 | 47,098,000 | 38,681,734 | 48,982,906 | |
| | (13)={(9)+(10)}/2 | | (14)={(11)+(12)}/2 | | |
| Average salaries | | 42,905,000 | | 43,832,320 | |
| | (15)=(13)/(5) | | (16)=(14)/(6) | | |
| Ratio of average salaries to average sales | | 12.0% | | 10.0% | |
| | (17)={(14)−(13)}/{(6)−(5)} | | | | |
| Variable cost ratio a | 0.011555799 | | | | |
| | (18)=(14)−(6)×(17) | | | | |
| Fixed cost b | 38,759,971 | | | | |
| | (19)=(8)×(17)+(18) | | | | |
| | 43,382,291 | | | | |
| Cost standard of salaries | 43,400,000 | | | | Second smallest value of (13), (14) and (19) (rounding upwards of less than 100 thousand yen) |

FIG. 17

SYSTEM AND METHOD FOR DETERMINING A FRANCHISEE COMMITMENT FEE BASED ON A DETERMINED COST STANDARD

CROSS-REFERENCE TO RELATED APPLICATIONS

This application is a Continuation of International Patent Application No. PCT/JP2008/062628, filed on Jul. 11, 2008, the contents of which are incorporated herein by reference in their entirety.

FIELD OF THE INVENTION

The present invention relates to a cost standard determination system for determining a cost standard which serves as a basis for the calculation of a commitment fee for a store operation.

BACKGROUND OF THE INVENTION

In recent years, businesses using various operational commission systems, as represented by franchise businesses, have been conducted. In general, in the case where a store owner who owns a store commits the operation of the store to a store operator, the commitment fee that is paid by the store owner to the store operator is determined, in many cases, on the basis of only the sales or profit.

For example, an amount which is calculated by multiplying the sales of the store by a predetermined ratio, or an amount which is calculated by multiplying the profit of the store by a predetermined ratio, is determined to be the commitment fee.

However, in the system in which the commitment fee is simply determined based on only the sales or profit of the store, the operational effort by the store operator is not always reflected in the commitment fee. Thus, there are cases in which the ingenuity of the store operation by the store operator is not rewarded. In order to promote the independent support of employees, this problem has to be addressed.

This being the case, there has been a demand for a novel scheme for reflecting the operational effort by the store operator in the commitment fee.

As one of methods of evaluating the operation of the store by the store operator, an evaluation method based on the cost needed for the operation of the store by the store operator may be thought.

However, the cost consumed by the operation of the store includes costs corresponding to various accounts of different properties. How much cost is necessary for which account varies depending on the kind of store (e.g. a cost structure). In addition, the cost consumed also varies depending on the business situation.

Therefore, in order to properly evaluate the operation of the store by the store operator, it is necessary to realize a novel evaluation method which takes into account the property of each of a plurality of accounts.

SUMMARY OF THE INVENTION

One aspect of the invention is to provide a cost standard determination system which can determine, in consideration of a business situation, a proper cost standard based on the properties of a plurality of accounts, so that the operational effort of a store by a store operator may be reflected in a commitment fee.

According to an embodiment of the invention, there is provided a cost standard determination system for determining a cost standard which is needed for an operation of a store, the cost standard serving as a basis for a calculation of a commitment fee which is paid from a store owner, who owns the store, to a store operator to whom the operation of the store is committed, the cost standard being determined in every accounting period, based on management performances in an immediately previous accounting period and a second previous accounting period of a plurality of directly managed stores which are operated by the store owner, the system comprising: a first storage unit; a second storage unit; and a cost standard calculation unit.

The first storage unit is configured to store profit-and-loss statement data corresponding to the previous accounting period and the second previous accounting period of each of the plurality of directly managed stores. The second storage unit is configured to store attribute data indicating which of a controllable attribute, which relates to a variable cost varying in accordance with sales, is controllable and requires a curb of cost, a permittable attribute which relates to a fixed cost not varying in accordance with sales, is controllable and is allowable up to a predetermined allowable limit, and an uncontrollable attribute, which relates to a fixed cost not varying in accordance with sales and is uncontrollable, each of a plurality of accounts relating to costs belongs to.

The cost standard calculation unit is configured to calculate, based on the profit-and-loss statement data, a cost standard corresponding to each of the plurality of accounts. The cost standard calculation unit comprises a determination unit, a first arithmetic unit, a second arithmetic unit, and a third arithmetic unit.

The determination unit is configured to read the attribute data corresponding to a calculation-target account, with respect to which the cost standard is to be calculated, from the second storage unit, and to determine, based on the read attribute data, which of the controllable attribute, the permittable attribute and the uncontrollable attribute the calculation-target account belongs to.

The first arithmetic unit is configured to execute, when it is determined that the calculation-target account belongs to the controllable attribute, a first cost standard calculation process including a process of reading, from the first storage unit, sales of each of the directly managed stores in the second previous accounting period, and a cost corresponding to the calculation-target account of each of the directly managed stores in the second previous accounting period, and calculating a first ratio which is a ratio of an average cost corresponding to the calculation-target account of the plurality of directly managed stores in the second previous accounting period to average sales of the plurality of the directly managed stores in the second previous accounting period, a process of reading, from the first storage unit, sales of each of the directly managed stores in the previous accounting period, and a cost corresponding to the calculation-target account of each of the directly managed stores in the previous accounting period, and calculating a second ratio which is a ratio of an average cost corresponding to the calculation-target account of the plurality of directly managed stores in the previous accounting period to average sales of the plurality of the directly managed stores in the previous accounting period, a process of calculating a variable cost ratio and a fixed cost relating to the cost of the calculation-target account, based on the sales of each of the directly managed stores and the cost corresponding to the calculation-target account of each of the directly managed stores in the second previous accounting period and the sales of each of the directly managed stores and the cost corresponding to the calculation-target account of each of the directly managed stores in the previous accounting period, and calculating a third ratio which is a ratio of an amount, which is obtained by adding the fixed cost to an amount which is obtained by multiplying the variable cost ratio by predetermined reference sales, to the reference sales, and a process of determining a ratio at a predetermined numerical position in an order from the lowest of the first ratio, the second ratio and the third ratio to be a ratio of the cost standard corresponding to the calculation-target account to sales of a current accounting period of the store operated by the store operator.

The second arithmetic unit is configured to execute, when it is determined that the calculation-target account belongs to the permittable attribute, a second cost standard calculation process including a process of reading, from the first storage unit, a cost corresponding to the calculation-target account of each of the directly managed stores in the second previous accounting period, and calculating a first amount which is an amount of an average cost corresponding to the calculation-target account of the plurality of directly managed stores in the second previous accounting period, a process of reading, from the first storage unit, a cost corresponding to the calculation-target account of each of the directly managed stores in the previous accounting period, and calculating a second amount which is an amount of an average cost corresponding to the calculation-target account of the plurality of directly managed stores in the previous accounting period, a process of reading, from the first storage unit, the sales of each of the directly managed stores in the second previous accounting period and the sales of each of the directly managed stores in the previous accounting period, calculating a variable cost ratio and a fixed cost relating to the cost of the calculation-target account, based on the sales of each of the directly managed stores and the cost corresponding to the calculation-target account of each of the directly managed stores in the second previous accounting period and the sales of each of the directly managed stores and the cost corresponding to the calculation-target account of each of the directly managed stores in the previous accounting period, and calculating a third amount which is an amount obtained by adding the fixed cost to an amount which is obtained by multiplying the variable cost ratio by predetermined reference sales, and a process of determining an amount at a predetermined numerical position in an order from the smallest of the first amount, the second amount and the third amount to be the cost standard corresponding to the calculation-target account.

The third arithmetic unit is configured to execute, when it is determined that the calculation-target account belongs to the uncontrollable attribute, a third cost standard calculation process of reading an amount corresponding to the calculation-target account from preset cost standard data, and determining the amount to be the cost standard corresponding to the calculation-target account.

According to this cost standard determination system, a proper cost standard based on the property of each of a plurality of accounts can be determined by considering the business situation, and thereby the operational effort of a store by a store operator can be reflected in a commission fee.

BRIEF DESCRIPTION OF THE DRAWINGS

FIG. 1 is a block diagram showing the structure of a cost standard determination system according to an embodiment of the invention;

FIG. 2 shows an example of an account attribute definition table which is provided in the cost standard determination system of the embodiment;

FIG. 3 shows an example of a calculation processing definition table which is provided in the cost standard determination system of the embodiment;

FIG. 9 shows a part of an example of the cost standard calculation which is executed by the cost standard determination system of the embodiment;

FIG. 10 shows another part of the example of the cost standard calculation which is executed by the cost standard determination system of the embodiment;

FIG. 11 shows still another part of the example of the cost standard calculation which is executed by the cost standard determination system of the embodiment;

FIG. 12 shows still another part of the example of the cost standard calculation which is executed by the cost standard determination system of the embodiment;

FIG. 13 shows still another part of the example of the cost standard calculation which is executed by the cost standard determination system of the embodiment;

FIG. 14 shows still another part of the example of the cost standard calculation which is executed by the cost standard determination system of the embodiment;

FIG. 15 shows still another part of the example of the cost standard calculation which is executed by the cost standard determination system of the embodiment;

FIG. 16 shows an example of the cost standard calculation of purchase that is an account of a controllable attribute, which is executed by the cost standard determination system of the embodiment; and FIG. 17 shows an example of the cost standard calculation of salaries that are an account of a permittable attribute, which is executed by the cost standard determination system of the embodiment.

DETAILED DESCRIPTION

Figure 4:
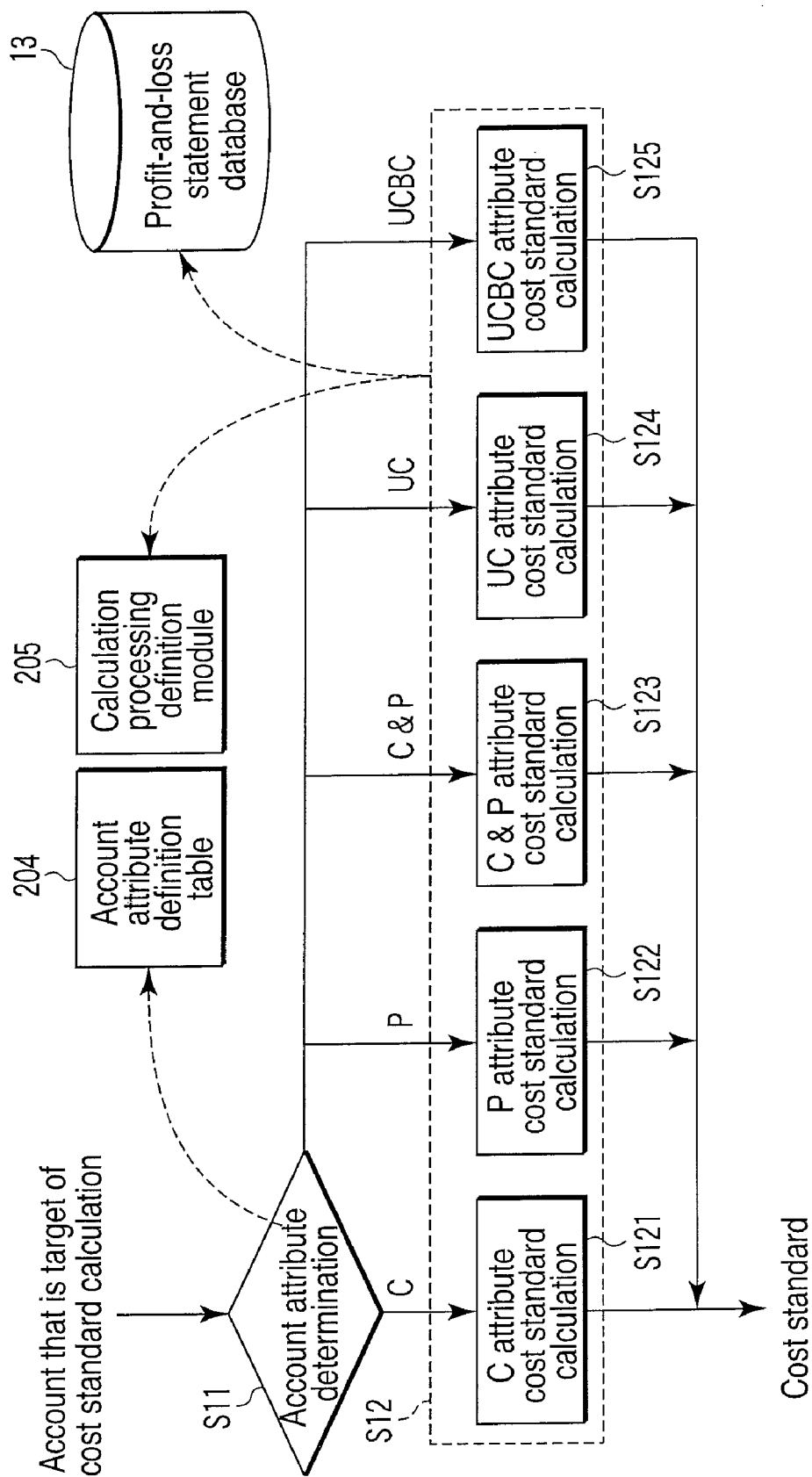
FIG. 4 is a flowchart illustrating the procedure of a cost standard calculation process which is executed by the cost standard determination system of the embodiment.

An embodiment of the invention will now be described with reference to the accompanying drawings.

To begin with, referring to FIG. 1, the structure of a cost standard determination system according to an embodiment of the invention is described. This cost standard determination system is a system which determines a cost standard which is needed for an operation of a store, the cost standard serving as a basis for the calculation of a commitment fee. The commitment fee is paid by an owner company (store owner) of the store to an operating company (store operator), to which the owner company commits the operation of the store. The cost standard determination system is realized by a computer.

In the cost standard determination system, the cost standard is determined based on operating results of a plurality of existing directly managed stores which are operated by the owner company. Each directly managed store and a store, which is operated by the operating company, conduct businesses of the same kind. For example, the operating company is managed by an ex-employee who is independent from the owner company. This operating company operates a store, the operation of which is committed by the owner company. This store is owned by the owner company. The owner company pays a commitment fee to the operating company. It is the above-described cost standard that serves as the basis for the calculation of the commitment fee. In calculating the commitment fee, the cost standard can be used as a reference value for evaluating the operation of the store by the operating company. Specifically, the cost standard is determined with respect to each of the accounts relating to the cost. The cost standard of each account serves as a reference value for evaluating the cost of each account, which has been consumed by the operation of the store by the operating company.

The cost standard in the current accounting period is determined based on the operating results of a plurality of directly managed stores over the two preceding accounting periods (the previous accounting period and second previous accounting period). For example, the cost standard of fiscal 2008 that is the current accounting period is determined based on the operating results of a plurality of directly managed stores in fiscal 2007 that is the previous accounting period and the operating results of the plurality of directly managed stores in fiscal 2006 that is the second previous accounting period. In this manner, the cost standard determination system determines the cost standard in every accounting period. In other words, the cost standard is updated in every accounting period by current information, that is, the operating results of the directly managed stores in the two previous accounting periods. Thus, the proper cost standard, in which the latest business situation and the actual performance of each directly managed store have been considered, can be determined. In addition, by evaluating the operational effort of the operating company with use of the cost standard, it becomes possible to properly reflect the operational effort of the operating company in the commitment fee. As a result, the independence support of employees can be promoted.

As the commitment fee, use may be made of an amount which can be obtained by totaling an amount, which is calculated based on a difference between the sales in the current period of the store operated by the operating company and the cost standard, and an amount which is calculated based on a difference between the cost consumed in the current accounting period by the store operated by the operating company and the cost standard. For example, an amount, which is obtained by multiplying the difference between the sales of the store operated by the operating company and the cost standard by a predetermined ratio (e.g. 0.5) can be calculated as a basic commitment fee. In addition, the difference between the actual cost consumed by the operation of the store operated by the operating company and the cost standard is calculated as an additional commitment fee. The total of the basic commitment fee and additional commitment fee is a commitment fee which is paid to the operating company by the owner company.

Each directly managed store is, for instance, a wedding hall. In this case, the store, the operation of which is committed to the operating company by the owner company, is also a wedding hall. Needless to say, it should suffice if each directly managed store and the store, the operation of which is committed, are business stores of the same kind. These stores are not limited to wedding halls, and may be, for instance, hotels, retail stores, business branches, etc. In other words, the stores in this embodiment are not limited to stores of specific business categories or business types, and may be unbiasedly adaptive to any business kind or business type.

The cost standard determination system may have a function of calculating a commitment fee in each accounting period, in addition to the function of determining the cost standard.

As shown in FIG. 1, the cost standard determination system comprises a central processing unit (CPU) 11, a memory 12 and a profit-and-loss statement database 13.

The CPU 11 is a processor which executes various programs. The CPU 11 is an arithmetic unit which performs an arithmetic operation for calculating a cost standard. Specifically, the CPU 11 executes a cost standard determination program 121 which is stored in the memory 12, thereby executing a process for calculating the cost standard, based on profit-and-loss statement data stored in the profit-and-loss statement database 13.

The memory 12 is a storage device for storing the cost standard determination program 121 which is executed by the CPU 11. The cost standard determination program 121 executes a process of determining a cost standard corresponding to each of accounts relating to costs. Cost standards corresponding to individual accounts are determined based on the properties of the individual accounts. Specifically, the cost standard is calculated based on an attribute which is set for each account.

In the present embodiment, the following five attributes are used in order to specify the attributes (properties) of the respective accounts on the cost:

C: Controllable attribute,
P: Permittable attribute,
C & P: Controllable & permittable attribute,
UC: Uncontrollable attribute, and
UCBC: Uncontrollable-based-charge attribute.

(1) C: Controllable Attribute

The controllable attribute is a cost attribute, which relates to a variable cost varying in accordance with sales, is controllable and requires a curb of cost. Specifically, the controllable attribute is an attribute of a cost, which varies in accordance with sales and has such a property that a degree of control thereof is large and a great profit can be obtained by further control, depending on efforts. An account with such an attribute that cost reduction can be realized by an operating method of an operating company is classified into the controllable attribute.

(2) P: Permittable Attribute

The permittable attribute is a cost attribute of a fixed cost, which does not vary in accordance with sales and which can be controlled and can be allowed up to a predetermined allowable limit. Specifically, the permittable attribute is an attribute of a cost, which is fixed and does not vary in accordance with sales and which has such a property that a degree of control thereof is large but, since there is an allowable limit in management, the cost exceeding the allowable limit must be avoided.

(3) C & P: Controllable & Permittable Attribute

The controllable & permittable attribute is a cost attribute of a variable cost, which varies in accordance with sales and by control of which the profit can be increased, but which requires an allowable range and careful control. Specifically, an account having properties of both the controllable attribute and permittable attribute belongs to the controllable & permittable attribute.

(4) UC: Uncontrollable Attribute

The uncontrollable attribute is a cost attribute of a fixed cost, which does not vary in accordance with sales and which cannot be controlled. Specifically, the uncontrollable attribute is an attribute of a cost, which does not vary in accordance with sales and cannot be controlled by the store operator, but which must be considered in conducting management. An account having such an attribute that a fixed cost, which does not vary in accordance with sales, is necessary, and cost reduction cannot be achieved by an operating method of the store operator, belongs to the uncontrollable attribute.

(5) UCBC: Uncontrollable-Based-Charge Attribute

The uncontrollable-based-charge attribute is a cost attribute of a cost which varies in accordance with sales and cannot be controlled by the store operator, but which must be considered in conducting management. An account having such an attribute that a certain amount of cost, which varies in accordance with sales, is necessary, and cost reduction cannot be achieved by an operating method of the store operator, belongs to the uncontrollable-based-charge attribute.

All of these five cost attributes may not necessarily be used. Only three cost attributes, namely, the controllable attribute, permittable attribute and uncontrollable attribute, may be used, and the respective accounts may be classified into these three cost attributes.

Further, the cost standard determination program 121 has a function of calculating, based on the cost standard, a commitment fee which is paid to the operating company (store operator) by the owner company (store owner).

The profit-and-loss statement database 13 is a storage device for storing profit-and-loss statement data which is indicative of operating results corresponding to the previous accounting period (e.g. fiscal 2007) and second previous accounting period (e.g. fiscal 2006) of each of a plurality of directly managed stores (directly managed first store to directly managed $N^{th}$ store) which are operated by the owner company. Specifically, the profit-and-loss statement database 13 stores profit-and-loss statement data 13-1a of the previous accounting period of the directly managed first store, profit-and-loss statement data 13-1b of the second previous accounting period of the directly managed first store, profit-and-loss statement data 13-2a of the previous accounting period of the directly managed second store, profit-and-loss statement data 13-2b of the second previous accounting period of the directly managed second store, . . . , profit-and-loss statement data 13-Na of the previous accounting period of the directly managed $N^{th}$ store, and profit-and-loss statement data 13-Nb of the second previous accounting period of the directly managed $N^{th}$ store. Each profit-and-loss data indicates the sales (amount of sales) of the directly managed store in the corresponding accounting period and the cost corresponding to each of the plural accounts.

The cost standard determination program 121 comprises a cost standard calculation module 201, an account attribute determination module 202, a commitment fee calculation module 203, an account attribute definition table 204, and a calculation processing definition module 205.

The cost standard calculation module 201 includes five cost standard calculation processing functions corresponding to the above-described cost attributes (controllable attribute, permittable attribute, controllable & permittable attribute, uncontrollable attribute, and uncontrollable-based-charge attribute). By selectively using the five cost standard calculation processing functions, the cost standard calculation module 201 calculates cost standards with respect to a plurality of accounts on the cost. The five cost standard calculation processing functions include cost standard determination formulae corresponding to the five cost attributes, respectively. Specifically, the cost standard calculation module 201 includes the following five cost standard determination formulae as the cost standard calculation processing functions.

(1) Cost Standard Determination Formula Corresponding to the Controllable Attribute This cost standard determination formula describes a procedure (expression) for calculating a cost standard corresponding to an account which is determined to belong to the controllable attribute. According to this cost standard determination formula, the cost standard calculation module 201 executes the following cost standard calculation process (process A).

The cost standard calculation module 201 analyzes the profit-and-loss statement data by using a division formula for dividing costs into fixed costs and variable costs (hereinafter referred to as "fixed/variable division formula"), thereby calculating a variable cost ratio and a fixed cost with respect to the cost of an account which is a target of cost standard calculation. The variable cost ratio and the fixed cost are calculated based on the sales of each directly managed store in the second previous accounting period, the cost corresponding to the calculation-target account of each directly managed store in the second previous accounting period, the sales of each directly managed store in the previous accounting period, and the cost corresponding to the calculation-target account of each directly managed store in the previous accounting period.

Assume now that the average sales (mean value of sales) of the directly managed first store to directly managed $N^{th}$ store in the second previous accounting period is A (sales). Also assume that the average cost (mean value of costs) corresponding to the calculation-target account of the directly managed first store to directly managed $N^{th}$ store in the second previous accounting period is A (cost). Similarly, it is assumed that the average sales of the directly managed first store to directly managed $N^{th}$ store in the previous accounting period is B (sales), and the average cost corresponding to the calculation-target account of the directly managed first store to directly managed $N^{th}$ store in the previous accounting period is B (cost). In this case, the cost standard calculation module 201 calculates a variable cost ratio a and a fixed cost b with respect to the calculation-target account, by using the following formula (fixed/variable division formula):

$$a=\{(B(\text{cost})-A(\text{cost})\}/\{(B(\text{sales})-A(\text{sales})\} \qquad \text{(formula 1)}$$

$$b=B(\text{cost})-B(\text{sales})\times a \qquad \text{(formula 2)}$$

In this manner, in the embodiment, the variable cost ratio a is calculated from the variation amount of the average sales of plural directly managed stores and the variation amount of the average cost of plural directly managed stores. Accordingly, the variable cost ratio a and the fixed cost b with respect to the cost of the calculation-target account can be calculated by taking into account the business situation and the actual performance of each directly managed store.

Then, the cost standard calculation module 201 calculates a ratio (%) of the amount (reference sales×a+b), which is obtained by adding the fixed cost b to the amount which is obtained by multiplying the variable cost ratio a by predetermined reference sales, to the reference sales. The reference sales are, for example, the greater of the average value of A (sales) and B (sales) and a predetermined reference value. The predetermined reference value is hereinafter referred to as "minimum reference sales".

The cost standard calculation module 201 compares the calculated ratio (first ratio) with a ratio (second ratio) of the average cost (A (cost)), which corresponds to the calculation-target account of the directly managed first store to directly managed $N^{th}$ store, to the average sales (A (sales)) of the directly managed first store to directly managed $N^{th}$ store in the second previous accounting period, and with a ratio (third ratio) of the average cost (B (cost)), which corresponds to the calculation-target account of the directly managed first store to directly managed $N^{th}$ store, to the average sales (B (sales)) of the directly managed first store to directly managed $N^{th}$ store in the previous accounting period. The cost standard calculation module 201 determines, for example, the lowest ratio (%) of the first to third ratios (%) to be the cost standard (cost standard ratio) corresponding to the calculation-target account. The determined ratio (%) indicates a ratio (%) of the cost standard to the sales performance of the current accounting period of the store that is operated by the operating company. The reason why the lowest ratio (%) is used as the cost standard (cost standard ratio) is that the controllable attribute (hereinafter referred to as "C attribute") is a cost attribute which requires an effort to reduce costs.

In the meantime, of the above-described three ratios (%), a ratio at a predetermined numerical position in the order from the lowest ratio may be determined to be the cost standard (cost standard ratio). The numeral position in the order from the lowest one, the ratio at which is to be determined to be the cost standard, is determined by the cost standard determination formula corresponding to the C attribute.

In this manner, the cost standard corresponding to the account belonging to the C attribute is calculated as the ratio (%). This ratio (%), as described above, indicates the ratio (%) of the cost standard to the sales of the current accounting period of the store that is operated by the operating company. Since the account belonging to the controllable attribute is a variable cost, not the amount but the ratio (%) is used as the value (cost standard ratio) indicating the cost standard. Thereby, a more proper cost standard can be set.

(2) Cost Standard Determination Formula Corresponding to the Permittable Attribute This cost standard determination formula describes a procedure (expression) for calculating a cost standard corresponding to an account which is determined to belong to the permittable attribute. According to this cost standard determination formula, the cost standard calculation module 201 executes the following cost standard calculation process (process B).

The cost standard calculation module 201 analyzes the profit-and-loss statement data by using the above-described fixed/variable division formula, thereby calculating a variable cost ratio a and a fixed cost b with respect to the cost of an account which is a target of calculation. Then, the cost standard calculation module 201 calculates a first amount which is an amount (reference sales×a+b) which is obtained by adding the fixed cost b to the amount which is obtained by multiplying the variable cost ratio a by the above-described reference sales. The cost standard calculation module 201 compares the calculated amount (reference sales×a+b) with a second amount which is the average cost (A (cost)) corresponding to the calculation-target account of the directly managed first store to directly managed $N^{th}$ store in the second previous accounting period, and with a third amount which is the average cost (B (cost)) corresponding to the calculation-target account of the directly managed first store to directly managed $N^{th}$ store in the previous accounting period. The cost standard calculation module 201 determines, for example, a second lowest amount of the first to third amounts to be the cost standard corresponding to the calculation-target account. The reason why the second lowest amount is used as the cost standard is that the permittable attribute (hereinafter referred to as "P attribute") is a cost attribute which allows the consumption of a cost up to a predetermined allowable range. By using the second lowest amount as the cost standard, the allowable range can be relaxed. In the meantime, of the above-described three amounts, an amount at a predetermined numerical position in the order from the lowest amount may be determined to be the cost standard. The numeral position in the order from the lowest amount, the amount at which is to be determined to be the cost standard, is determined by the cost standard determination formula corresponding to the P attribute.

In this manner, the cost standard corresponding to the account belonging to the P attribute is calculated as the fixed amount (annual fixed amount). Since the account belonging to the P attribute is a fixed cost which does not vary in accordance with sales, the fixed amount (annual fixed amount) is used as the value indicating the cost standard. Thereby, a more proper cost standard can be set.

(3) Cost Standard Determination Formula Corresponding to the Controllable & Permittable Attribute This cost standard determination formula describes a procedure (expression) for calculating a cost standard corresponding to an account which is determined to belong to the controllable & permittable attribute. According to this cost standard determination formula, the cost standard calculation module 201 executes the following cost standard calculation process (process C).

The cost standard calculation module 201 analyzes the profit-and-loss statement data by using the above-described fixed/variable division formula, thereby calculating a variable cost ratio a and a fixed cost b with respect to the cost of an account which is a target of calculation. Then, the cost standard calculation module 201 calculates a ratio (first ratio) of the amount (reference sales×a+b), which is obtained by adding the fixed cost b to the amount which is obtained by multiplying the variable cost ratio a by the above-described reference sales, to the reference sales. The cost standard calculation module 201 compares the calculated ratio (first ratio) with a ratio (second ratio) of the average cost (A (cost)), which corresponds to the calculation-target account of the directly managed first store to directly managed $N^{th}$ store, to the average sales (A (sales)) of the directly managed first store to directly managed $N^{th}$ store in the second previous accounting period, and with a ratio (third ratio) of the average cost (B (cost)), which corresponds to the calculation-target account of the directly managed first store to directly managed $N^{th}$ store, to the average sales (B (sales)) of the directly managed first store to directly managed $N^{th}$ store in the previous accounting period. The cost standard calculation module 201 determines, for example, a second lowest ratio (%) of the first to third ratios (%) to be the cost standard corresponding to the calculation-target account. The reason why the second lowest ratio (%) is used as the cost standard is that the controllable & permittable attribute (hereinafter referred to as "C attribute") is a cost attribute which requires cost control and relaxes the allowable range. In the meantime, of the above-described three ratios (%), a ratio at a predetermined numerical position in the order from the lowest ratio may be determined to be the cost standard. The numeral position in the order from the lowest one, the ratio at which is to be determined to be the cost standard, is determined by the cost standard determination formula corresponding to the C & P attribute.

(4) Cost Standard Determination Formula Corresponding to the Uncontrollable Attribute This cost standard determination formula describes a procedure (expression) for calculating a cost standard corresponding to an account which is determined to belong to the uncontrollable attribute (hereinafter referred to as "UC attribute"). According to this cost standard determination formula, the cost standard calculation module 201 executes the following cost standard calculation process (process D).

The cost standard calculation module 201 reads an amount corresponding to a calculation-target account from preset cost standard data, and determines this amount to be the cost standard corresponding to the calculation-target account.

The cost standard data is, for example, data comprising a plurality of accounts belonging to the UC attribute, and cost standard amounts corresponding to the respective accounts. It is possible to prepare in advance a UC attribute cost standard data table which stores this data. In this case, the cost standard calculation module 201 reads an amount corresponding to the calculation-target account from the UC attribute cost standard data table, and determines this amount to be the cost standard corresponding to the calculation-target account.

(5) Cost Standard Determination Formula Corresponding to the Uncontrollable-Based-Charge Attribute This cost standard determination formula describes a procedure (expression) for calculating a cost standard corresponding to an account which is determined to belong to the uncontrollable-based-charge attribute (hereinafter referred to as "UCBC attribute"). According to this cost standard determination formula, the cost standard calculation module 201 executes a cost standard calculation process (process E) for calculating, as a cost standard corresponding to a calculation-target account, a ratio (%) which is calculated based on the actual results of a plurality of directly managed stores in the past two years, or this ratio (%) which is prestored in the UCBC attribute cost standard data table.

The cost standard calculation module 201 includes five arithmetic process modules E1 to E5 which execute the above-described five cost standard calculation processes (processes A, B, C, D and E). The arithmetic process module E1 executes the cost standard calculation process (process A) corresponding to the C attribute, the arithmetic process module E2 executes the cost standard calculation process (process B) corresponding to the P attribute, the arithmetic process module E3 executes the cost standard calculation process (process C) corresponding to the C & P attribute, the arithmetic process module E4 executes the cost standard calculation process (process D) corresponding to the UC attribute, and the arithmetic process module E5 executes the cost standard calculation process (process E) corresponding to the UCBC attribute.

The account attribute determination module 202 refers to the account attribute definition table 204 and determines which of the above-described five attributes (C, P, C & P, UC, UCBC) the calculation-target account belongs to. The commitment fee calculation module 203 calculates the commitment fee which is paid from the owner company (store owner) of a store to the operating company (store operator) to which the operation of the store is committed.

The account attribute definition table 204 is a table indicating the correspondency between accounts and the attributes of the accounts. The account attribute definition table 204 stores attribute data indicating, with respect to a plurality of accounts on the cost, which of the C attribute, P attribute, C & P attribute, UC attribute and UCBC attribute each of the accounts belongs to. The account attribute determination module 202 reads the attribute data corresponding to the calculation-target account from the account attribute definition table 204, and can determine, based on the read attribute data, which of the C attribute, P attribute, C & P attribute, UC attribute and UCBC attribute the calculation-target account belongs to.

The account attribute definition table 204 can be rewritten by an administrator, and it is possible to add accounts and to change the attributes of the accounts.

The calculation processing definition module 205 stores process identification data indicating which of the cost standard calculation processes A, B, C, D and E the cost standard calculation process corresponding to each of the five attributes (C, P, C & P, UC and UCBC) is.

A select module SEL, which is provided in the cost standard calculation module 201, reads, from the calculation processing definition module 205, the process identification data corresponding to the attribute (C, P, C & P, UC, or UCBC) which is determined by the account attribute determination module 202. Based on the read process identification data, the select module SEL selects one of the arithmetic process modules E1 to E5 as the arithmetic module which is to execute the cost standard calculation process corresponding to the calculation-target account.

FIG. 2 shows an example of the attribute data stored in the account attribute definition table 204. The account attribute definition table 204 includes a plurality of entries corresponding to a plurality of accounts. In each entry, an account field and an attribute field are defined. The account field of each entry stores account data indicating the title of the account. The attribute field of each entry stores attribute data indicating which of the above-described five attributes (attributes C, P, C & P, UC and UCBC) the corresponding account belongs to.

In the present embodiment, for example, purchase (cost of purchase), a sales promotion expense, a travel and transportation/commutation expense, supplies, repairs, a linen expense, utilities, communication, a rental expense, and a recruit expense are classified into the C attribute. For example, salaries, a meeting, an outsourcing expense and a commission are classified into the P attribute. For example, wages, advertising, a stationery expense and miscellaneous expenses are classified into the C & P attribute. For example, a legal welfare expense, insurance, taxes (fixed asset tax), a management expense and interest are classified into the UC attribute. For example, taxes (stamp tax) and a management service expense are classified into the UCBC attribute. These accounts and attributes can be rewritten by the administrator, as described above.

FIG. 3 shows an example of the process identification data stored in the calculation processing definition table 205.

The calculation processing definition table 205 includes five entries corresponding to the above-described five attributes. In each entry, an attribute field and a process identification field are defined. The attribute field stores account attribute data indicative of an attribute name. The process identification field stores process identification data (process ID) indicative of the cost standard process corresponding to the attribute name in the attribute field.

Next, referring to a flowchart of FIG. 4, a description is given of a flow of a process of calculating cost standards corresponding to a plurality of accounts, respectively, on the basis of profit-and-loss statement data which is stored in the profit-and-loss statement database 13.

The CPU 11 executes the cost standard determination program 121, thereby executing the following process.

Specifically, the CPU 11 successively selects a calculation-target account from a plurality of accounts included in the profit-and-loss calculation data stored in the profit-and-loss statement database 13, and calculates a cost standard with respect to each selected calculation-target account.

To begin with, under the control of the account attribute determination module 202, the CPU 11 reads the attribute data corresponding to the calculation-target account from the account attribute definition table 204. Then, based on the read data, the CPU 11 determines which of the C attribute, P attribute, C & P attribute, UC attribute and UCBC attribute the calculation-target account belongs to (S11).

Subsequently, under the control of the select module SEL of the cost standard calculation module 201, the CPU 11 reads the process identification data corresponding to the attribute of the calculation-target account from the calculation processing definition module 205. Then, according to the select module SEL, the CPU 11 executes a process of selecting one of a plurality of arithmetic modules E1 to E5, based on the read identification data. The CPU 11 executes the selected arithmetic module and executes a cost standard calculation process corresponding to the calculation-target account (S12). Specifically, each of the arithmetic modules E1 to E5 may be realized as a kind of function. The CPU 11 calls the selected function (arithmetic module) and executes the function. In step S12, if the attribute of the calculation-target account is the C attribute, the CPU 11 calls the arithmetic module E1 which is associated with process identification data A, thereby executing the cost standard calculation process A corresponding to the C attribute (S121). If the attribute of the calculation-target account is the P attribute, the CPU 11 calls the arithmetic module E2 which is associated with process identification data B, thereby executing the cost standard calculation process B corresponding to the P attribute (S122). If the attribute of the calculation-target account is the C & P attribute, the CPU 11 calls the arithmetic module E3 which is associated with process identification data C, thereby executing the cost standard calculation process C corresponding to the C & P attribute (S123). If the attribute of the calculation-target account is the UC attribute, the CPU 11 calls the arithmetic module E4 which is associated with process identification data D, thereby executing the cost standard calculation process D corresponding to the UC attribute (S124). If the attribute of the calculation-target account is the UCBC attribute, the CPU 11 calls the arithmetic module E5 which is associated with process identification data E, thereby executing the cost standard calculation process E corresponding to the UCBC attribute (S125).

Figure 5:
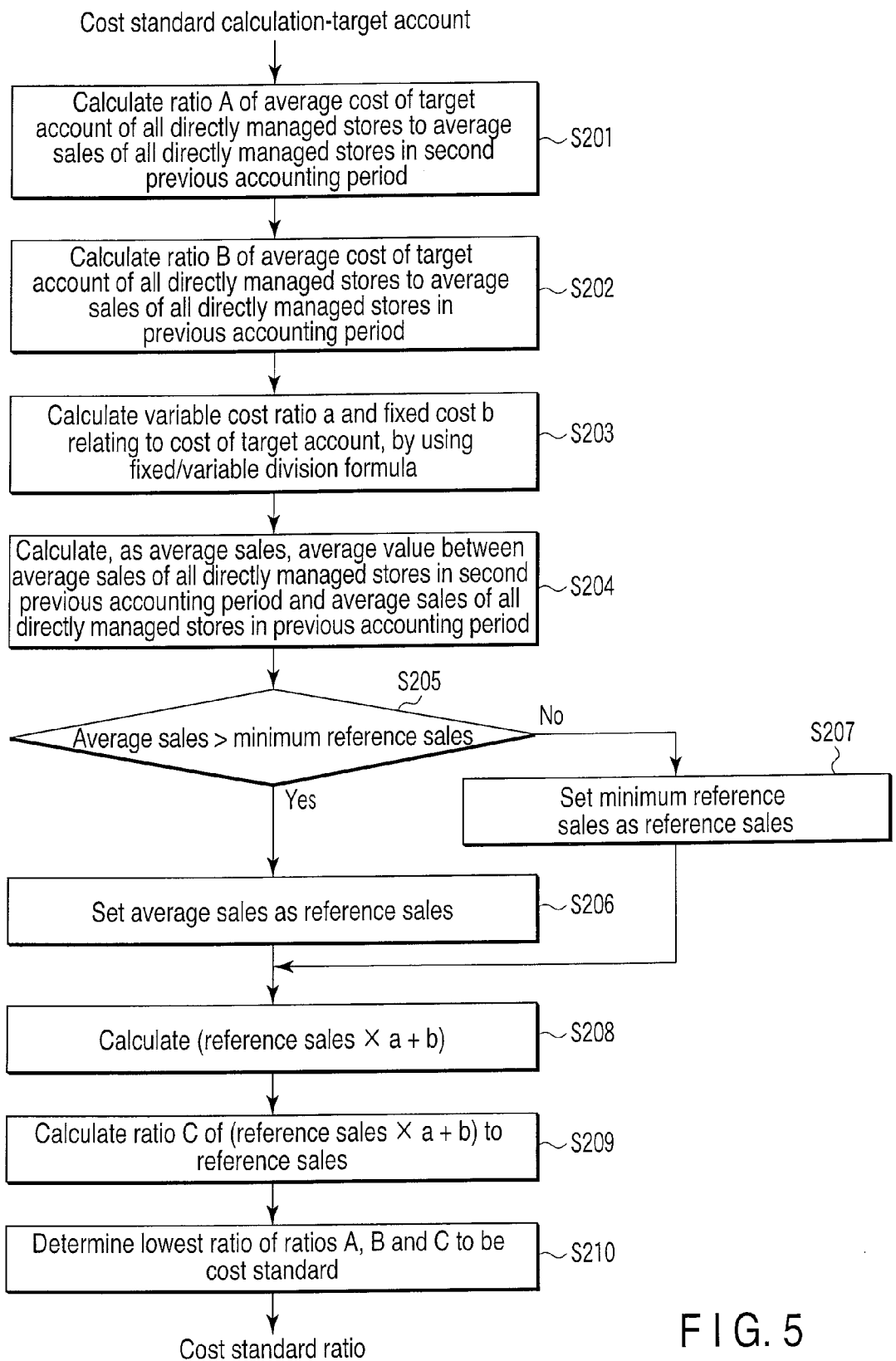
FIG. 5 is a flowchart illustrating the procedure of a cost standard calculation process of a controllable attribute, which is executed by the cost standard determination system of the embodiment.

Next, referring to a flowchart of FIG. 5, a description is given of the procedure of the cost standard calculation process A corresponding to the C attribute, which is executed in step S121 in FIG. 4.

To start with, the CPU 11 reads, from the profit-and-loss statement database 13, the sales data of each of the directly managed first store to directly managed $N^{th}$ store in the second previous accounting period, and the cost data corresponding to the calculation-target account of each of the directly managed first store to directly managed $N^{th}$ store in the second previous accounting period. Then, based on the read sales data and cost data, the CPU 11 calculates a ratio (hereinafter referred to as first ratio A) of a value (average cost), which is obtained by averaging the costs of the calculation-target account of the directly managed first store to directly managed $N^{th}$ store in the second previous accounting period, to a value (average sales), which is obtained by averaging the sales of the directly managed first store to directly managed $N^{th}$ store in the second previous accounting period (S201). Subsequently, the CPU 11 reads, from the profit-and-loss statement database 13, the sales data of each of the directly managed first store to directly managed $N^{th}$ store in the previous accounting period, and the cost data corresponding to the calculation-target account of each of the directly managed first store to directly managed $N^{th}$ store in the previous accounting period. Then, based on the read sales data and cost data, the CPU 11 calculates a ratio (hereinafter referred to as second ratio B) of a value (average cost), which is obtained by averaging the costs of the calculation-target account of the directly managed first store to directly managed $N^{th}$ store in the previous accounting period, to a value (average sales), which is obtained by averaging the sales of the directly managed first store to directly managed $N^{th}$ store in the previous accounting period (S202). Following the above, the CPU 11 analyzes, based on the above-described fixed/variable division formula, the sales data and cost data of the directly managed first store to directly managed $N^{th}$ store in the second previous accounting period and the sales data and cost data of the directly managed first store to directly managed $N^{th}$ store in the previous accounting period, and calculates a variable cost ratio a and a fixed cost b relating to the calculation-target account (S203).

In step S203, the CPU 11 calculates the variable cost ratio a by the above-described formula 1, and calculates the fixed cost b by the above-described formula 2. Specifically, the CPU 11 subtracts an amount (A (cost)), which is obtained by averaging the costs corresponding to the calculation-target account of the directly managed first store to directly managed $N^{th}$ store in the second previous accounting period, from an amount (B (cost)) which is obtained by averaging the costs corresponding to the calculation-target account of the directly managed first store to directly managed $N^{th}$ store in the previous accounting period, thereby calculating a variation amount (B (cost)−A (cost)) of the cost. In addition, the CPU 11 subtracts an amount (A (sales)), which is obtained by averaging the sales of the directly managed first store to directly managed $N^{th}$ store in the second previous accounting period, from an amount (B (sales)) which is obtained by averaging the sales of the directly managed first store to directly managed $N^{th}$ store in the previous accounting period, thereby calculating a variation amount (B (sales)−A (sales)) of the sales. Then, the CPU 11 calculates the ratio of the calculated variation amount (B (cost)−A (cost)) of the cost to the calculated variation amount (B (sales)−A (sales)) of the sales, as the variation cost ratio a relating to the calculation-target account. Further, the CPU 11 subtracts an amount (B (sales)× a), which is obtained by multiplying the amount (B (sales)), which is obtained by averaging the sales of the directly managed first store to directly managed $N^{th}$ store in the previous accounting period, by the variable cost ratio a, from the amount (B (cost)) which is obtained by averaging the costs corresponding to the calculation-target account of the directly managed first store to directly managed $N^{th}$ store in the previous accounting period. Thereby, the CPU 11 calculates the amount (B (cost)−B (sales)×a) as the fixed cost b relating to the calculation-target account.

Next, the CPU 11 executes a process of determining reference sales (S204 to S207). Specifically, the CPU 11 first calculates a value, which is obtained by averaging the average sales (store average sales) of the directly manages first store to directly managed $N^{th}$ store of the second previous accounting period and average sales (store average sales) of the directly manages first store to directly managed $N^{th}$ store of the previous accounting period, as average sales of two accounting periods (accounting-period store average sales) (S204). The CPU 11 compares the average sales (accounting-period store average sales) and minimum reference sales (S205). The minimum reference sales are, for example, an amount which is calculated in advance by a process such as a break-even point analysis so as to produce a predetermined profit. If the accounting-period store average sales are greater than the minimum reference sales (YES in S205), the CPU 11 sets the accounting-period store average sales as reference sales (S206). On the other hand, if the accounting-period store average sales are not greater than the minimum reference sales (NO in S205), the CPU 11 sets the minimum reference sales as reference sales (S207).

Thereafter, the CPU 11 calculates a value which is obtained by multiplying the variable cost ratio a by the reference sales and adding the fixed cost b to the multiplied result, that is, the reference sales×a+b (S208). Then, by dividing (reference sales×a+b) by the reference sales, the CPU 11 calculates the ratio of (reference sales×a+b) to the reference sales, as a third ratio C (S209). Of the first ratio A, second ratio B and third ratio C, for example, the CPU 11 determines the lowest value as the cost standard (cost standard ratio) corresponding to the calculation-target account (S210).

Figure 6:
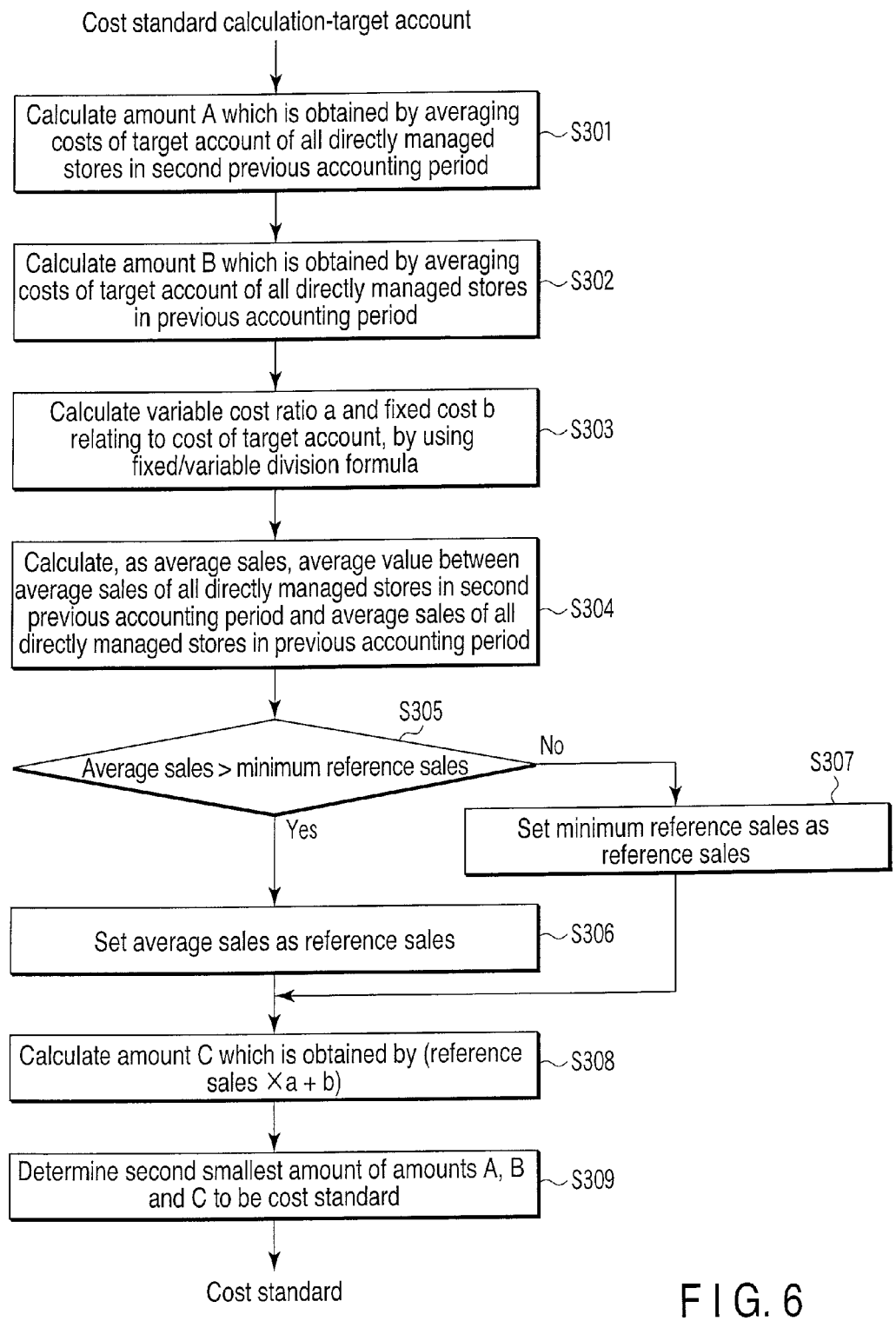
FIG. 6 is a flowchart illustrating the procedure of a cost standard calculation process of a permittable attribute, which is executed by the cost standard determination system of the embodiment.

Next, referring to a flowchart of FIG. 6, a description is given of the procedure of the cost standard calculation process corresponding to the P attribute, which is executed in step S122 in FIG. 4.

To start with, the CPU 11 reads, from the profit-and-loss statement database 13, the cost data corresponding to the calculation-target account of each of the directly managed first store to directly managed $N^{th}$ store in the second previous accounting period. Based on the read cost data, the CPU 11 calculates an amount (hereinafter referred to as "first amount A") which is obtained by averaging the costs of the target account of the directly managed first store to directly managed $N^{th}$ store in the second previous accounting period (S301). Then, the CPU 11 reads, from the profit-and-loss statement database 13, the cost data corresponding to the calculation-target account of each of the directly managed first store to directly managed $N^{th}$ store in the previous accounting period. Based on the read cost data, the CPU 11 calculates an amount (hereinafter referred to as "second amount B") which is obtained by averaging the costs of the target account of the directly managed first store to directly managed $N^{th}$ store in the previous accounting period (S302).

Thereafter, the CPU 11 reads, from the profit-and-loss statement database 13, the sales data of the directly managed first store to directly managed $N^{th}$ store in the second previous accounting period and the sales data of the directly managed first store to directly managed $N^{th}$ store in the previous accounting period. The CPU 11 analyzes, based on the above-described fixed/variable division formula, the sales data and cost data of the directly managed first store to directly managed $N^{th}$ store in the second previous accounting period and the sales data and cost data of the directly managed first store to directly managed $N^{th}$ store in the previous accounting period, and calculates a variable cost ratio a and a fixed cost b relating to the calculation-target account (S303). In step S303, the same process as in step S203 in FIG. 5 is executed.

Next, the CPU 11 executes a process of determining reference sales (S304 to S307). In steps S304 to S307, the same process as in steps S204 to S207 in FIG. 5 is executed.

The CPU 11 calculates an amount (hereinafter referred to as "third amount C") which is obtained by adding the fixed cost b to the amount which is obtained by multiplying the variable cost ratio a by the reference sales, that is, (reference sales×a+b) (S308). Of the first amount A, second amount B and third amount C, the CPU 11 determines, for example, the second smallest amount to be the cost standard which corresponds to the calculation-target account (S309). In this manner, the cost standard of the account belonging to the P attribute is calculated, not as the ratio but as the amount.

Figure 7:
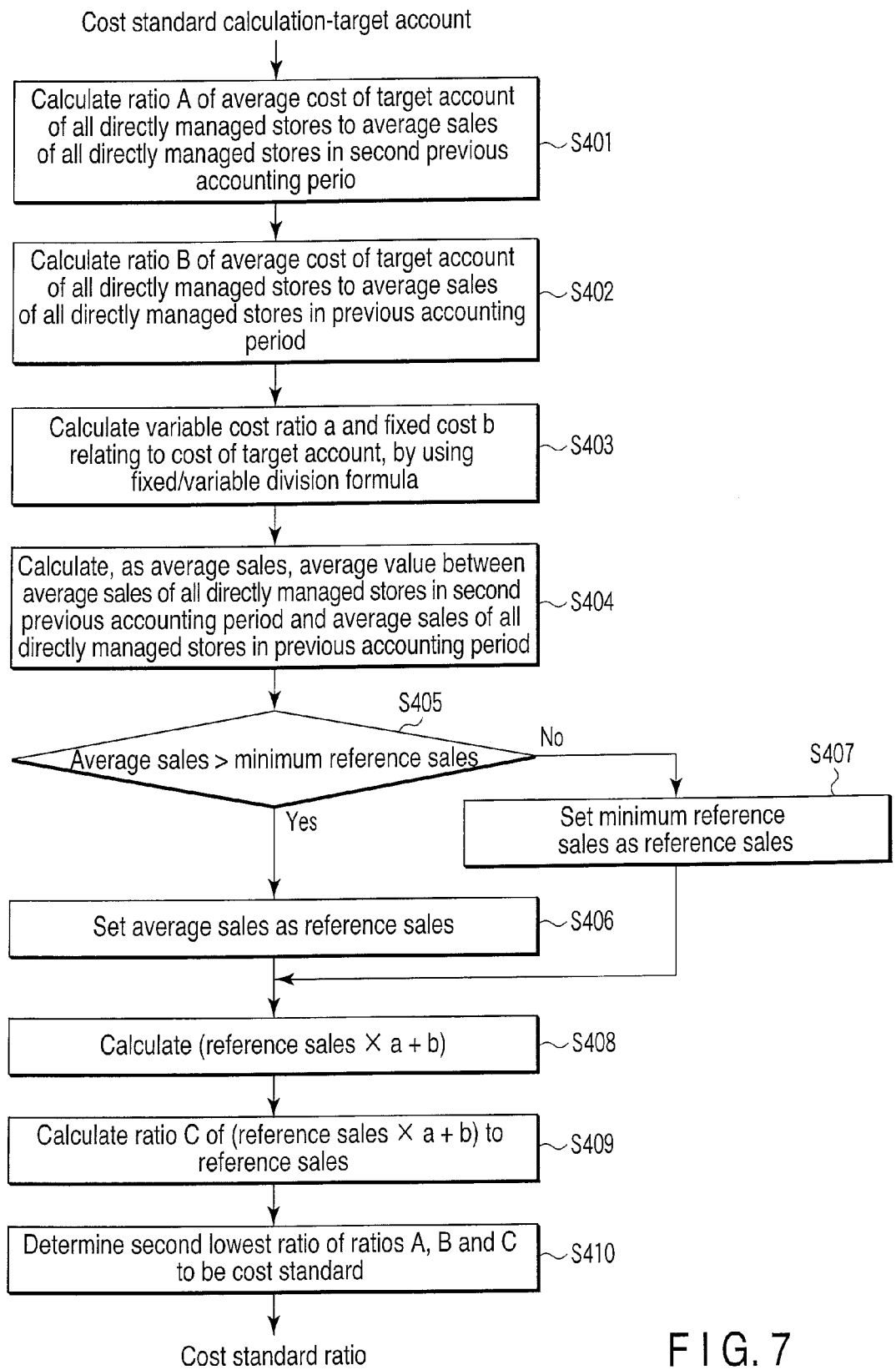
FIG. 7 is a flowchart illustrating a cost standard calculation process of a controllable & permittable attribute, which is executed by the cost standard determination system of the embodiment.

Next, referring to a flowchart of FIG. 7, a description is given of the procedure of the cost standard calculation process corresponding to the C & P attribute, which is executed in step S123 in FIG. 4.

Figure 8:
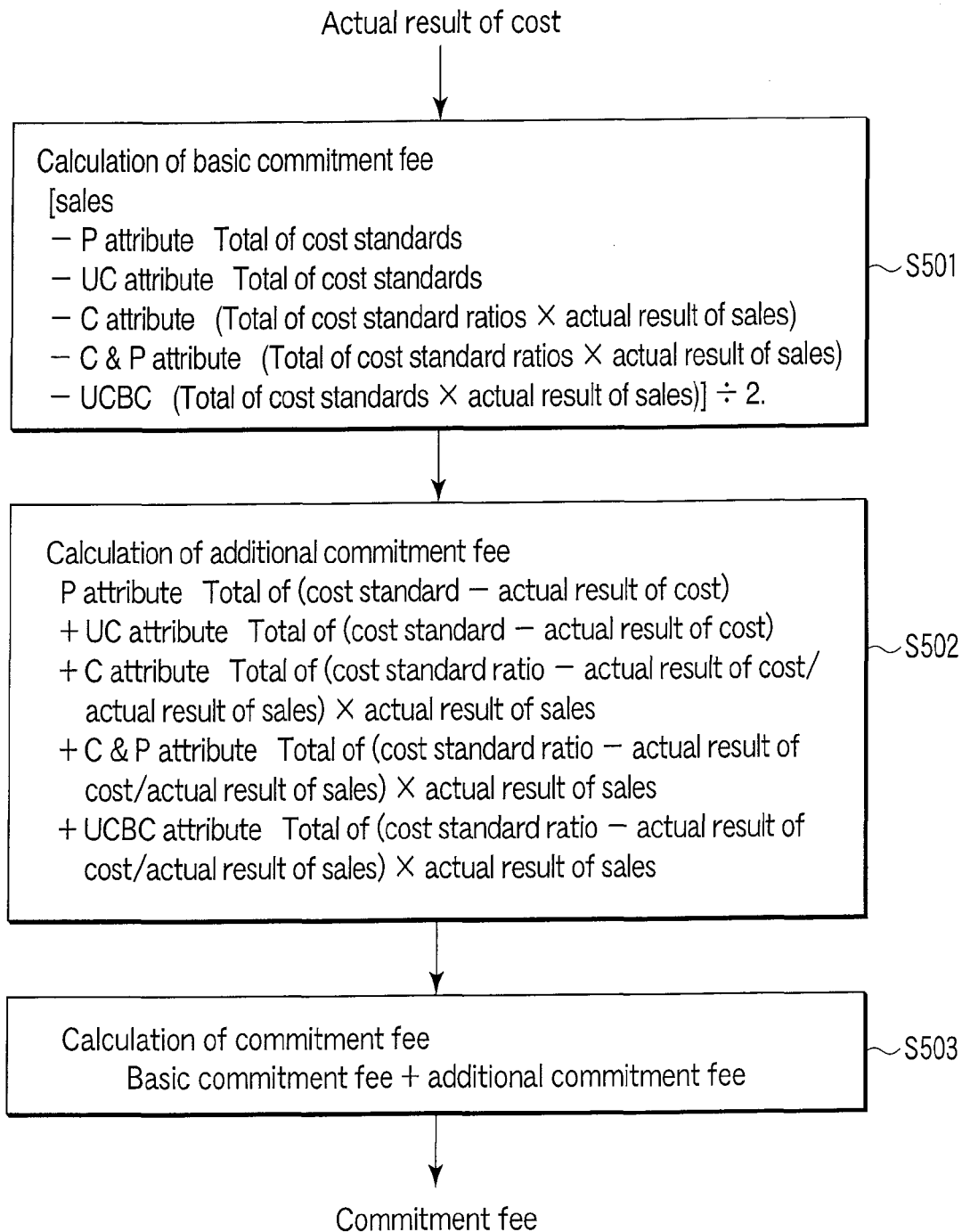
FIG. 8 is a flowchart illustrating the procedure of a commitment fee calculation process which is executed by the cost standard determination system of the embodiment.

The process in steps S401 to S409 in FIG. 7 is the same as the process in steps S201 to S209 in FIG. 5. The difference between the cost standard calculation process in FIG. 7 and the cost standard calculation process in FIG. 8 is the process in step S410 in FIG. 7. Specifically, in the cost standard calculation process corresponding to the C & P attribute, for example, the second lowest ratio of the ratio A, ratio B and ratio C is determined to be the cost standard ratio which is the ratio of the cost standard to the sales (S410).

Next, referring to FIG. 8, the procedure of a commitment fee calculation process is described.

Under the control of the commitment fee calculation module 203, the CPU 11 executes the following process by using the cost standards calculated by the cost standard calculation module 201 with respect to the respective accounts.

The CPU 11 obtains the actual result of sales and the actual result of costs of the respective accounts, from the profit-and-loss statement data of the current accounting period of the store which is operated by the operating company. The CPU 11 calculates a commitment fee, based on the actual result of sales, the actual result of costs and the cost standards calculated with respect to the respective accounts. Specifically, the CPU 11 calculates the commitment fee by adding an amount which is calculated based on a difference between the sales (the actual result of sales) of the current accounting period of the store operated by the operating company and the total of cost standards determined for the respective accounts, and an amount which is calculated based on the total of differences between the actual results of costs of the respective accounts, which were consumed by the operation of the store by the operating company, and the cost standards of the respective accounts.

Specifically, the CPU 11 first calculates a basic commitment fee (S501) by executing an arithmetic operation of {actual result of sales−(total of cost standards of accounts belong to P attribute)−(total of cost standards of accounts belong to UC attribute)−(total of cost standards of accounts belong to C attribute)×actual result of sales−(total of cost standards of accounts belong to C & P attribute)×actual result of sales−(total of cost standards of accounts belong to UCBC attribute)×actual result of sales}÷2.

Subsequently, the CPU 11 calculates an additional commitment fee (S502) by executing an arithmetic operation of {total of(cost standard−actual result of cost)relating to the respective accounts belonging to P attribute}+{total of(cost standard−actual result of cost)relating to the respective accounts belonging to UC attribute}+{total of(cost standard ratio−actual result of cost÷actual result of sales)relating to the respective accounts belonging to C attribute}×actual result of sales+{total of(cost standard ratio−actual result of cost÷actual result of sales)relating to the respective accounts belonging to C & P attribute}×actual result of sales+{total of(cost standard ratio−actual result of cost÷actual result of sales)relating to the respective accounts belonging to UCBC attribute}×actual result of sales.

The CPU 11 calculates the commitment fee (operational commitment fee) by adding the basic commitment fee and additional commitment fee (step S503).

FIG. 9 to FIG. 15 show examples of calculating cost standards from the profit-and-loss statement data of the directly managed first store and directly managed second store in fiscal 2006, and the profit-and-loss statement data of the directly managed first store and directly managed second store in fiscal 2007. According to these examples, an example of a flow of cost standard calculation is described. It is assumed that in the profit-and-loss statement data, the cost and the ratio of the cost to the sales (actual result of sales) are described with respect to each of accounts.

FIG. 9 shows the costs of the accounts of the directly managed first store in fiscal 2006, the ratios of the costs of the accounts to the sales of the directly managed first store in fiscal 2006, the costs of the accounts of the directly managed second store in fiscal 2006, and the ratios of the costs of the accounts to the sales of the directly managed second store in fiscal 2006.

As shown in FIG. 10, the CPU 11 prepares an A table by calculating values (average costs in fiscal 2006) which are obtained by averaging the costs of the accounts of the directly managed first store in fiscal 2006 and the costs of the accounts of the directly managed second store in fiscal 2006, and the ratios (average cost ratios in fiscal 2006) of the average costs of the directly managed first store and directly managed second store corresponding to the respective accounts in fiscal 2006, to the average sales of the directly managed first store and directly managed second store in fiscal 2006. If the value of each account of the directly managed first store in fiscal 2006 is "s" and the value of each account of the directly managed second store in fiscal 2006 is "t", values "A" (cost, and ratio of cost to sales) of each account in the A table are given by the following equations:

$$A = (s+t) \div 2 \ldots \text{cost(average cost in fiscal 2006)}$$

$$A(\%) = \{(s+t) \div 2\} \div \text{average sales} \ldots \text{the ratio of cost to sales(average cost ratio in fiscal 2006)}.$$

As the method of calculating the value of "A", use may be made of a method of calculating a weighted average of "s" and "t" by using weighting values which are set for the directly managed first store and directly managed second store, respectively. In this case, for example, the weighting value for the directly managed store having the greater management scale may be increased, or the weighting value for the directly managed store having a management scale, which is similar to the management scale of the store operated by the store operating company, may be increased.

FIG. 11 shows the costs of the accounts of the directly managed first store in fiscal 2007, the ratios of the costs of the accounts to the sales of the directly managed first store in fiscal 2007, the costs of the accounts of the directly managed second store in fiscal 2007, and the ratios of the costs of the accounts to the sales of the directly managed second store in fiscal 2007.

As shown in FIG. 12, the CPU 11 prepares a B table by calculating values (average costs in fiscal 2007) which are obtained by averaging the costs of the accounts of the directly managed first store in fiscal 2007 and the costs of the accounts of the directly managed second store in fiscal 2007, and the ratios (average cost ratios in fiscal 2007) of the average costs of the directly managed first store and directly managed second store corresponding to the respective accounts in fiscal 2007, to the average sales of the directly managed first store and directly managed second store in fiscal 2007. If the value of each account of the directly managed first store in fiscal 2007 is "u" and the value of each account of the directly managed second store in fiscal 2007 is "v", values "B" (cost, and ratio of cost to sales) of each account in the B table are given by the following equations:

$$B = (u+v) \div 2 \ldots \text{cost(average cost in fiscal 2007)}$$

$$B(\%) = \{(u+v) \div 2\} \div \text{average sales} \ldots \text{the ratio of cost to sales(average cost ratio in fiscal 2007)}.$$

In the meantime, as the method of calculating the value of "B", the above-described weighted averaging method may also be used.

As shown in FIG. 13, the CPU calculates average sales C over two fiscal years, by averaging the average sales in fiscal 2006 described in column NO. 1 in the A table and the average sales in fiscal 2007 described in column NO. 36 in the B table. The CPU 11 compares the average sales C with the above-described minimum reference sales, and sets the greater of the two as reference sales D.

In the meantime, weighted averaging, which uses weighting values that are set for individual stores or fiscal years, may be used for the calculation of the average sales C and the average costs corresponding to the respective accounts. For example, as the method of calculating the average sales C over two fiscal years, use may be made of a method of calculating a weighted average of the average sales in fiscal 2006 described in column NO. 1 in the A table and the average sales in fiscal 2007 described in column NO. 36 in the B table, by using weighting values which are set for the fiscal 2006 and fiscal 2007, respectively. In this case, the weighting value corresponding to the average sales in fiscal 2007 may be set to greater than the weighting value corresponding to the average sales in fiscal 2006. In addition, for example, weighting values, which are similar to the weighting values used in the calculation of the average sales, may be used for the calculation of the average of the costs corresponding to the respective accounts.

As shown in FIG. 13, based on the sales and the values of the accounts on the cost in each of the A table and B table, the CPU 11 calculates the variable cost ratio a and fixed cost b with respect to each of the accounts on the cost. Taking "purchase" as an example, an example of calculation of the variable cost ratio a and fixed cost b is described.

The variable cost ratio a relating to the purchase is calculated by the following equation:

$$a = \{B(\text{purchase}) - A(\text{purchase})\} \div \{B(\text{sales}) - A(\text{sales})\}$$

where B (purchase) is the amount of the cost of purchase in the B table, A (purchase) is the amount of the cost of purchase in the A table, B (sales) is the amount of the sales in the B table, and A (sales) is the amount of the sales in the A table.

The fixed cost b relating to the purchase is calculated by the following equation:

$$b = B(\text{purchase}) - B(\text{sales}) \times a$$

Needless to say, the fixed cost b of the same value as in the above equation can be calculated by the following equation:

$$b = A(\text{purchase}) - A(\text{sales}) \times a$$

Thereafter, as shown in FIG. 14, the CPU 11 prepares a C table by calculating (reference sales D×a+b) with respect to each account on the cost. The variable cost ratio a and fixed cost b are unique values which are calculated for each of the respective accounts on the cost.

As shown in FIG. 15, based on the attributes of the accounts on the cost, the CPU 11 determines the cost standards from the values in the A table, B table and C table. The cost standards corresponding to the respective attributes are determined as follows:

| | |
|---|---|
| C attribute: | the lowest ratio [%] of the values in the A table of FIG. 10, the B table of FIG. 12 and the C table of FIG. 14, |
| P attribute: | the second smallest amount of the values in the A table of FIG. 10, the B table of FIG. 12 and the C table of FIG. 14, |
| C & P attribute: | the second lowest ratio [%] of the values in the A table of FIG. 10, the B table of FIG. 12 and the C table of FIG. 14, |
| UC attribute: | an amount set for each account, and |
| UCBC attribute: | a ratio [%] set for each account. |

Next, referring to FIG. 16, a description is given of an example in which the cost standard of "purchase", which belongs to the C attribute, is calculated by using concrete numerical values.

The CPU 11 obtains, from the profit-and-loss statement data, sales (1) in fiscal 2006 of the directly managed first store, sales (2) in fiscal 2006 of the directly managed second store, sales (3) in fiscal 2007 of the directly managed first store, and sales (4) in fiscal 2007 of the directly managed second store.

The CPU 11 averages the sales (1) in fiscal 2006 of the directly managed first store and the sales (2) in fiscal 2006 of the directly managed second store, thereby calculating average sales (5) in fiscal 2006. In addition, the CPU 11 averages the sales (3) in fiscal 2007 of the directly managed first store and the sales (4) in fiscal 2007 of the directly managed second store, thereby calculating average sales (6) in fiscal 2007.

The CPU 11 calculates average sales (7) by averaging the sales (1) in fiscal 2006 of the directly managed first store, sales (2) in fiscal 2006 of the directly managed second store, sales (3) in fiscal 2007 of the directly managed first store, and sales (4) in fiscal 2007 of the directly managed second store.

The CPU 11 compares the average sales (7) and the minimum reference sales, and sets the greater of these as reference sales (8).

The CPU 11 obtains, from the profit-and-loss statement data, the cost (9) of purchase in fiscal 2006 of the directly managed first store, cost (10) of purchase in fiscal 2006 of the directly managed second store, cost (11) of purchase in fiscal 2007 of the directly managed first store, and cost (12) of purchase in fiscal 2007 of the directly managed second store.

The CPU 11 averages the cost (9) of purchase in fiscal 2006 of the directly managed first store and the cost (10) of purchase in fiscal 2006 of the directly managed second store, thereby calculating an average purchase amount (13) which is an average of the costs of purchase in fiscal 2006. In addition, the CPU 11 averages the cost (11) of purchase in fiscal 2007 of the directly managed first store and the cost (12) of purchase in fiscal 2007 of the directly managed second store, thereby calculating an average purchase amount (14) which is an average of the costs of purchase in fiscal 2007.

The CPU 11 calculates a ratio (15) of the fiscal 2006 average purchase amount (13) to the fiscal 2006 average sales (5), and a ratio (16) of the fiscal 2007 average purchase amount (14) to the fiscal 2007 average sales (6). The CPU 11 calculates, by the fixed/variable division formula, the ratio of a difference between the fiscal 2007 average purchase amount (14) and the fiscal 2006 average purchase amount (13) to a difference between the fiscal 2007 average sales (6) and the fiscal 2006 average sales (5), and sets the calculated value as a variable cost ratio a (17).

The CPU 11 calculates, as a fixed cost b (18), a value which is obtained by subtracting from the fiscal 2007 average purchase amount (14) the value that is obtained by multiplying the fiscal 2007 average sales (6) by the variable cost ratio a (17). The CPU 11 calculates a value (19) which is obtained by adding the fixed cost b (18) to a value which is obtained by multiplying the reference sales (8) by the variable cost ratio a (17). The CPU 11 calculates a ratio (20) of the value (19) to the reference sales (8). The CPU 11 determines, for example, the lowest value of the ratio (15), ratio (16) and ratio (20) to be the cost standard of the purchase.

FIG. 17 shows an example in which the cost standard of salaries, which belong to the P attribute, is calculated by using concrete numerical values.

For example, the second smallest value of fiscal 2006 average salaries (13), fiscal 2007 average salaries (14) and an amount (19) obtained by the fixed/variable division formula is used as the cost standard of salaries belonging to the P attribute, As has been described above, according to the present embodiment, the controllable attribute, permittable attribute, controllable & permittable attribute, uncontrollable attribute, and uncontrollable-based-charge attribute are defined. A plurality of accounts are classified into these attributes, and cost standards are calculated by different formulae in association with the respective attributes. Thereby, proper cost standards can be determined for the individual accounts. Thus, the cost standard is used as a reference for evaluating the operation of the store by the operating company, and the commitment fee which is paid to the operating company is calculated based on the cost standard. In addition, the cost standard is calculated in every accounting period, based on the management performances of a plurality of directly managed stores over the immediately preceding two accounting periods. Therefore, the latest business situation and the actual performance of each directly managed store can be reflected in the cost standard for evaluating the operation of the store by the operating company, and the operational effort of the store by the operating company can be reflected in the commitment fee.

In the present embodiment, the case of using the five attributes has mainly been described. However, if at least three attributes, i.e. the controllable attribute, permittable attribute and uncontrollable attribute, are used, the proper cost standard can be determined.

Besides, the average value of sales/costs may be a weighted average value which is calculated by using weighting values that are set for the respective fiscal years, or weighting values that are set for the respective directly managed stores.

The cost standard calculation process of the present embodiment can be executed by the cost standard determination program 121. Thus, the same advantageous effects as with the present embodiment can easily be obtained simply by installing the cost standard determination program 121 into an ordinary computer through a computer-readable storage medium which stores the cost standard determination program 121.

The functions of the cost standard determination program 121 may also be realized by hardware, such as a DSP or a microcomputer.

The many features and advantages of the invention are apparent from the detailed specification, and, thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and, accordingly, all suitable modifications and equivalents may be resorted to that fall within the scope of the invention.

What is claimed is:

1. A cost standard determination system for determining a cost standard which is needed for an operation of a store, the cost standard serving as a basis for a calculation of a commitment fee which is paid from a store owner, who owns the store, to a store operator to whom the operation of the store is committed, the cost standard being determined in every accounting period, based on management performances in an immediately previous accounting period and a second previous accounting period of a plurality of directly managed stores which are operated by the store owner, the system comprising:

a first storage unit configured to store profit-and-loss statement data corresponding to the previous accounting period and the second previous accounting period of each of the plurality of directly managed stores;

a second storage unit configured to store attribute data indicating to which of a controllable attribute, which relates to a variable cost varying in accordance with sales, is controllable and requires a curb of cost, a permittable attribute which relates to a fixed cost not varying in accordance with sales, is controllable and is allowable up to a predetermined allowable limit, and an uncontrollable attribute, which relates to a fixed cost not varying in accordance with sales and is uncontrollable, each of a plurality of accounts relating to costs belongs;

a cost standard calculation unit configured to calculate, based on the profit-and-loss statement data, a cost standard corresponding to each of the plurality of accounts, the cost standard calculation unit comprising:

a determination unit configured to read the attribute data corresponding to a calculation-target account, with respect to which the cost standard is to be calculated, from the second storage unit, and to determine, based on the read attribute data, to which of the controllable attribute, the permittable attribute and the uncontrollable attribute the calculation-target account belongs;

a first arithmetic unit configured to execute, when it is determined that the calculation-target account belongs to the controllable attribute, a first cost standard calculation process including a process of reading, from the first storage unit, sales of each of the directly managed stores in the second previous accounting period, and a cost corresponding to the calculation-target account of each of the directly managed stores in the second previous accounting period, and calculating a first ratio which is a ratio of an average cost corresponding to the calculation target account of the plurality of directly managed stores in the second previous accounting period to average sales of the plurality of the directly managed stores in the second previous accounting period, a process of reading, from the first storage unit, sales of each of the directly managed stores in the previous accounting period, and a cost corresponding to the calculation-target account of each of the directly managed stores in the previous accounting period, and calculating a second ratio which is a ratio of an average cost corresponding to the calculation-target account of the plurality of directly managed stores in the previous accounting period to average sales of the plurality of the directly managed stores in the previous accounting period, a process of calculating a variable cost ratio and a fixed cost relating to the cost of the calculation-target account, based on the sales of each of the directly managed stores and the cost corresponding to the calculation-target account of each of the directly managed stores in the second previous accounting period and the sales of each of the directly managed stores and the cost corresponding to the calculation-target account of each of the directly managed stores in the previous accounting period, and calculating a third ratio which is a ratio of an amount, which is obtained by adding the fixed cost to an amount which is obtained by multiplying the variable cost ratio by predetermined reference sales, to the reference sales, and a process of determining a ratio at a predetermined numerical position in an order from the lowest of the first ratio, the second ratio and the third ratio to be a ratio of the cost standard corresponding to the calculation-target account to sales of a current accounting period of the store operated by the store operator;

a second arithmetic unit configured to execute, when it is determined that the calculation-target account belongs to the permittable attribute, a second cost standard calculation process including a process of reading, from the first storage unit, a cost corresponding to the calculation-target account of each of the directly managed stores in the second previous accounting period, and calculating a first amount which is an amount of an average cost corresponding to the calculation-target account of the plurality of directly managed stores in the second previous accounting period, a process of reading, from the first storage unit, a cost corresponding to the calculation-target account of each of the directly managed stores in the previous accounting period, and calculating a second amount which is an amount of an average cost corresponding to the calculation-target account of the plurality of directly managed stores in the previous accounting period, a process of reading, from the first storage unit, the sales of each of the directly managed stores in the second previous accounting period and the sales of each of the directly managed stores in the previous accounting period, calculating a variable cost ratio and a fixed cost relating to the cost of the calculation-target account, based on the sales of each of the directly managed stores and the cost corresponding to the calculation-target account of each of the directly managed stores in the second previous accounting period and the sales of each of the directly managed stores and the cost corresponding to the calculation-target account of each of the directly managed stores in the previous accounting period, and calculating a third amount which is an amount obtained by adding the fixed cost to an amount which is obtained by multiplying the variable cost ratio by predetermined reference sales, and a process of determining an amount at a predetermined numerical position in an order from the smallest of the first amount, the second amount and the third amount to be the cost standard corresponding to the calculation-target account; and a third arithmetic unit configured to execute, when it is determined that the calculation-target account belongs to the uncontrollable attribute, a third cost standard calculation process of reading an amount corresponding to the calculation-target account from preset cost standard data, and determining the amount to be the cost standard corresponding to the calculation-target account; and a commitment fee calculation unit configured to calculate the commitment fee by adding an amount, which is calculated based on a difference between the sales of the store in the current accounting period and a total of the cost standards corresponding to the plurality of accounts, and an amount, which is calculated based on a total of differences between actual results of the costs of the respective accounts, which are consumed by the operation of the store in the current accounting period, and the cost standards of the respective accounts.

2. The cost standard determination system of claim 1, wherein the first arithmetic unit is configured to determine the lowest of the first ratio, the second ratio and the third ratio to be the ratio of the cost standard corresponding to the calculation-target account to the sales of the current accounting period of the store operated by the store operator.

3. The cost standard determination system of claim 2, wherein the second arithmetic unit is configured to determine the second smallest of the first amount, the second amount and the third amount to be the cost standard corresponding to the calculation-target account.

4. The cost standard determination system of claim 1, wherein the first arithmetic unit is configured to execute a process of calculating a variation amount of the cost, which is obtained by subtracting the average cost corresponding to the calculation-target account of the plurality of directly managed stores in the second previous accounting period from the average cost corresponding to the calculation-target account of the plurality of directly managed stores in the previous accounting period, a process of calculating a variation amount of the sales, which is obtained by subtracting the average sales of the plurality of directly managed stores in the second previous accounting period from the average sales of the plurality of directly managed stores in the previous accounting period, a process of calculating a ratio of the calculated variation amount of the cost to the calculated variation amount of the sales as the variable cost ratio relating to the cost of the calculation-target account, and a process of calculating, as the fixed cost relating to the cost of the calculation-target account, an amount which is obtained by subtracting an amount, which is obtained by multiplying the average sales of the plurality of directly managed stores in the previous accounting period by the variable cost ratio, from the average cost corresponding to the calculation-target account of the plurality of directly managed stores in the previous accounting period.

5. The cost standard determination system of claim 4, wherein the second arithmetic unit is configured to execute a process of calculating a variation amount of the cost, which is obtained by subtracting the average cost corresponding to the calculation-target account of the plurality of directly managed stores in the second previous accounting period from the average cost corresponding to the calculation-target account of the plurality of directly managed stores in the previous accounting period, a process of calculating a variation amount of the sales, which is obtained by subtracting the average sales of the plurality of directly managed stores in the second previous accounting period from the average sales of the plurality of directly managed stores in the previous accounting period, a process of calculating a ratio of the calculated variation amount of the cost to the calculated variation amount of the sales as the variable cost ratio relating to the cost of the calculation-target account, and a process of calculating, as the fixed cost relating to the cost of the calculation-target account, an amount which is obtained by subtracting an amount, which is obtained by multiplying the average sales of the plurality of directly managed stores in the previous accounting period by the variable cost ratio, from the average cost corresponding to the calculation-target account of the plurality of directly managed stores in the previous accounting period.

6. A cost standard determination system for determining a cost standard which is needed for an operation of a store, the cost standard serving as a basis for a calculation of a commitment fee which is paid from a store owner to a store operator to whom the operation of the store is committed, the cost standard being determined in every accounting period, based on management performances in an immediately previous accounting period and a second previous accounting period of a plurality of directly managed stores which are operated by the store owner, the system comprising:

a first storage unit configured to store profit-and-loss statement data corresponding to the previous accounting period and the second previous accounting period of each of the plurality of directly managed stores;

a cost standard calculation unit configured to calculate, based on the profit-and-loss statement data, a cost standard corresponding to each of a plurality of accounts, the cost standard calculation unit including:

a first arithmetic unit configured to execute a first cost standard calculation process including a process of reading, from the first storage unit, sales of each of the directly managed stores and a cost corresponding to a calculation-target account of each of the directly managed stores, and calculating a first ratio which is a ratio of an average cost corresponding to the calculation-target account of the plurality of directly managed stores in the second previous accounting period to average sales of the plurality of the directly managed stores in the second previous accounting period, a process of reading, from the first storage unit, sales of each of the directly managed stores in the previous accounting period, and a cost corresponding to the calculation-target account of each of the directly managed stores in the previous accounting period, and calculating a second ratio which is a ratio of an average cost corresponding to the calculation-target account of the plurality of directly managed stores in the previous accounting period to average sales of the plurality of the directly managed stores in the previous accounting period, a process of calculating a variable cost ratio and a fixed cost relating to the cost of the calculation-target account, based on the sales of each of the directly managed stores and the cost corresponding to the calculation-target account of each of the directly managed stores in the second previous accounting period and the sales of each of the directly managed stores and the cost corresponding to the calculation-target account of each of the directly managed stores in the previous accounting period, and calculating a third ratio which is a ratio of an amount, which is obtained by adding the fixed cost to an amount which is obtained by multiplying the variable cost ratio by predetermined reference sales, to the reference sales, and a process of determining a ratio at a predetermined numerical position in an order from the lowest of the first ratio, the second ratio and the third ratio to be a ratio of the cost standard corresponding to the calculation-target account to sales of a current accounting period of the store operated by the store operator, a second arithmetic unit configured to execute a second cost standard calculation process including a process of reading, from the first storage unit, a cost corresponding to the calculation-target account of each of the directly managed stores in the second previous accounting period, and calculating a first amount which is an amount of an average cost corresponding to the calculation-target account of the plurality of directly managed stores in the second previous accounting period, a process of reading, from the first storage unit, a cost corresponding to the calculation-target account of each of the directly managed stores in the previous accounting period, and calculating a second amount which is an amount of an average cost corresponding to the calculation-target account of the plurality of directly managed stores in the previous accounting period, a process of reading, from the first storage unit, the sales of each of the directly managed stores in the second previous accounting period and the sales of each of the directly managed stores in the previous accounting period, calculating a variable cost ratio and a fixed cost relating to the cost of the calculation-target account, based on the sales of each of the directly managed stores and the cost corresponding to the calculation-target account of each of the directly managed stores in the second previous accounting period and the sales of each of the directly managed stores and the cost corresponding to the calculation-target account of each of the directly managed stores in the previous accounting period, and calculating a third amount which is an amount obtained by adding the fixed cost to an amount which is obtained by multiplying the variable cost ratio by predetermined reference sales, and a process of determining an amount at a predetermined numerical position in an order from the smallest of the first amount, the second amount and the third amount to be the cost standard corresponding to the calculation-target account, and a third arithmetic unit configured to execute a third cost standard calculation process of reading an amount corresponding to the calculation-target account from preset cost standard data, and determining the amount to be the cost standard corresponding to the calculation-target account;

a second storage unit configured to store a first table configured to store attribute data indicating which of a controllable attribute, which relates to a variable cost varying in accordance with sales, is controllable and requires a curb of cost, a permittable attribute which relates to a fixed cost not varying in accordance with sales, is controllable and is allowable up to a predetermined allowable limit, and an uncontrollable attribute, which relates to a fixed cost not varying in accordance with sales and is uncontrollable, each of a plurality of accounts relating to costs belongs to, and a second table configured to store process identification data indicating which of the first cost standard calculation process, the second cost standard calculation process and the third cost standard calculation process is the cost standard calculation process corresponding to each of the controllable attribute, the permittable attribute and the uncontrollable attribute;

a determination unit configured to read the attribute data corresponding to a calculation-target account, with respect to which the cost standard is to be calculated, from the first table, and to determine, based on the read attribute data, which of the controllable attribute, the permittable attribute and the uncontrollable attribute the calculation-target account belongs to; and a select unit configured to read, when it is determined that the calculation-target account belongs to the controllable attribute, the process identification data corresponding to the controllable attribute from the second table, and to select, based on the read process identification data, the first arithmetic unit as the arithmetic unit which is to execute the cost standard calculation process corresponding to the calculation-target account, configured to read, when it is determined that the calculation-target account belongs to the permittable attribute, the process identification data corresponding to the permittable attribute from the second table, and to select, based on the read process identification data, the second arithmetic unit as the arithmetic unit which is to execute the cost standard calculation process corresponding to the calculation-target account, and configured to read, when it is determined that the calculation-target account belongs to the uncontrollable attribute, the process identification data corresponding to the uncontrollable attribute from the second table, and to select, based on the read process identification data, the third arithmetic unit as the arithmetic unit which is to execute the cost standard calculation process corresponding to the calculation-target account; and a commitment fee calculation unit configured to calculate the commitment fee by adding an amount, which is calculated based on a difference between the sales of the store in the current accounting period and a total of the cost standards corresponding to the plurality of accounts, and an amount, which is calculated based on a total of differences between actual results of the costs of the respective accounts, which are consumed by the operation of the store in the current accounting period, and the cost standards of the respective accounts.

7. The cost standard determination system of claim 6, wherein the first arithmetic unit is configured to determine the lowest of the first ratio, the second ratio and the third ratio to be the ratio of the cost standard corresponding to the calculation-target account to the sales of the current accounting period of the store operated by the store operator, and the second arithmetic unit is configured to determine the second smallest of the first amount, the second amount and the third amount to be the cost standard corresponding to the calculation-target account.

8. A computer-readable medium comprising a program which causes a computer to execute a process for determining a cost standard which is needed for an operation of a store, the cost standard serving as a basis for a calculation of a commitment fee which is paid from a store owner to a store operator to whom the operation of the store is committed, the cost standard being determined in every accounting period, based on management performances in an immediately previous accounting period and a second previous accounting period of a plurality of directly managed stores which are operated by the store owner, the program causing the computer to execute:

a determination procedure of reading, from an attribute table configured to store attribute data indicating which of a controllable attribute, which relates to a variable cost varying in accordance with sales, is controllable and requires a curb of cost, a permittable attribute which relates to a fixed cost not varying in accordance with sales, is controllable and is allowable up to a predetermined allowable limit, and an uncontrollable attribute, which relates to a fixed cost not varying in accordance with sales and is uncontrollable, each of a plurality of accounts relating to costs belongs to, the attribute data which corresponds to a calculation-target account with respect to which the cost standard is to be calculated, and determining, based on the read attribute data, which of the controllable attribute, the permittable attribute and the uncontrollable attribute the calculation-target account belongs to;

a procedure of executing, when it is determined that the calculation-target account belongs to the controllable attribute, a first cost standard calculation process including a process of reading, from a storage device of the computer which stores profit-and-loss statement data corresponding to the previous accounting period and the second previous accounting period of each of the plurality of directly managed stores, sales of each of the directly managed stores in the second previous accounting period, and a cost corresponding to the calculation-target account of each of the directly managed stores in the second previous accounting period, and calculating a first ratio which is a ratio of an average cost corresponding to the calculation-target account of the plurality of directly managed stores in the second previous accounting period to average sales of the plurality of the directly managed stores in the second previous accounting period, a process of reading, from the storage device, sales of each of the directly managed stores in the previous accounting period, and a cost corresponding to the calculation-target account of each of the directly managed stores in the previous accounting period, and calculating a second ratio which is a ratio of an average cost corresponding to the calculation-target account of the plurality of directly managed stores in the previous accounting period to average sales of the plurality of the directly managed stores in the previous accounting period, a process of calculating a variable cost ratio and a fixed cost relating to the cost of the calculation-target account, based on the sales of each of the directly managed stores and the cost corresponding to the calculation-target account of each of the directly managed stores in the second previous accounting period and the sales of each of the directly managed stores and the cost corresponding to the calculation-target account of each of the directly managed stores in the previous accounting period, and calculating a third ratio which is a ratio of an amount, which is obtained by adding the fixed cost to an amount which is obtained by multiplying the variable cost ratio by predetermined reference sales, to the reference sales, and a process of determining a ratio at a predetermined numerical position in an order from the lowest of the first ratio, the second ratio and the third ratio to be a ratio of the cost standard corresponding to the calculation-target account to sales of a current accounting period of the store operated by the store operator;

a procedure of executing, when it is determined that the calculation-target account belongs to the permittable attribute, a second cost standard calculation process including a process of reading, from the storage device, a cost corresponding to the calculation-target account of each of the directly managed stores in the second previous accounting period, and calculating a first amount which is an amount of an average cost corresponding to the calculation-target account of the plurality of directly managed stores in the second previous accounting period, a process of reading, from the storage device, a cost corresponding to the calculation-target account of each of the directly managed stores in the previous accounting period, and calculating a second amount which is an amount of an average cost corresponding to the calculation-target account of the plurality of directly managed stores in the previous accounting period, a process of reading, from the storage device, the sales of each of the directly managed stores in the second previous accounting period and the sales of each of the directly managed stores in the previous accounting period, calculating a variable cost ratio and a fixed cost relating to the cost of the calculation-target account, based on the sales of each of the directly managed stores and the cost corresponding to the calculation-target account of each of the directly managed stores in the second previous accounting period and the sales of each of the directly managed stores and the cost corresponding to the calculation-target account of each of the directly managed stores in the previous accounting period, and calculating a third amount which is an amount obtained by adding the fixed cost to an amount which is obtained by multiplying the variable cost ratio by predetermined reference sales, and a process of determining an amount at a predetermined numerical position in an order from the smallest of the first amount, the second amount and the third amount to be the cost standard corresponding to the calculation-target account;

a procedure of executing, when it is determined that the calculation-target account belongs to the uncontrollable attribute, a third cost standard calculation process of reading an amount corresponding to the calculation-target account from preset cost standard data, and determining the amount to be the cost standard corresponding to the calculation-target account; and a procedure of a calculating the commitment fee by adding an amount, which is calculated based on a difference between the sales of the store in the current accounting period and a total of the cost standards corresponding to the plurality of accounts, and an amount, which is calculated based on a total of differences between actual results of the costs of the respective accounts, which are consumed by the operation of the store in the current accounting period, and the cost standards of the respective accounts.

* * * * *